United States Patent [19]

Suman et al.

[11] Patent Number: 5,717,387

[45] Date of Patent: *Feb. 10, 1998

[54] REMOTE VEHICLE PROGRAMMING SYSTEM

[75] Inventors: Michael J. Suman; Mark L. Zeinstra, both of Holland, Mich.

[73] Assignee: Prince Corporation, Holland, Mich.

[*] Notice: The term of this patent shall not extend beyond the expiration date of Pat. No. 5,479,157.

[21] Appl. No.: 484,321

[22] Filed: Jun. 7, 1995

Related U.S. Application Data

[63] Continuation-in-part of Ser. No. 390,241, Feb. 17, 1995, Pat. No. 5,479,157, which is a continuation of Ser. No. 177,710, Jan. 5, 1994, abandoned, which is a continuation of Ser. No. 782,109, Oct. 24, 1991, abandoned, which is a continuation-in-part of Ser. No. 467,541, Jan. 19, 1990, Pat. No. 5,113,182.

[51] Int. Cl.⁶ .................................................. G06F 7/04
[52] U.S. Cl. .................... 340/825.31; 340/825.44; 340/825.69
[58] Field of Search ................. 340/825.31, 825.44, 340/825.22, 825.69, 825.72, 426; 379/56, 57, 59; 367/197; 307/10.1, 10.2; 180/287

[56] References Cited

U.S. PATENT DOCUMENTS

| | | |
|---|---|---|
| 3,824,469 | 7/1974 | Ristenbatt . |
| 4,143,368 | 3/1979 | Route et al. . |
| 4,515,994 | 5/1985 | Bolle et al. . |
| 4,665,379 | 5/1987 | Howell et al. . |
| 4,747,122 | 5/1988 | Bhagat et al. . |
| 4,754,255 | 6/1988 | Sanders et al. . |
| 4,794,368 | 12/1988 | Grossheim et al. . |
| 4,809,316 | 2/1989 | Namekawa . |
| 4,827,520 | 5/1989 | Zeinstra . |
| 4,845,708 | 7/1989 | Herrmann, Jr. et al. . |
| 4,849,750 | 7/1989 | Andros et al. . |
| 5,040,990 | 8/1991 | Suman et al. . |
| 5,081,667 | 1/1992 | Drori et al. ................ 379/59 |
| 5,113,427 | 5/1992 | Ryoichi et al. . |
| 5,146,215 | 9/1992 | Drori . |

OTHER PUBLICATIONS

PMR 2000, Personal Message Receiver, POCSAG (CCIR Radio Paging Code #1), Motorola, 1986.

*Primary Examiner*—Edwin C. Holloway, III
*Attorney, Agent, or Firm*—Price, Heneveld, Cooper, DeWitt & Litton

[57] ABSTRACT

The present invention relates to a vehicle accessory control system that includes a receiver for receiving paging signals including a unique vehicle address and a reprogramming signal. The control system responds to the reprogramming signal by reprogramming a vehicle accessory control program used to determine how to specifically control a vehicle accessory.

35 Claims, 27 Drawing Sheets

REMOTE VEHICLE PROGRAMMING SYSTEM

CROSS-REFERENCE TO RELATED PATENT APPLICATIONS

This application is a continuation-in-part of Ser. No. 08/390,241, filed on Feb. 17, 1995, now U.S. Pat. No. 5,479,157 issued Dec. 26, 1995, which is a continuation of abandoned U.S. patent application Ser. No. 08/177,710, filed Jan. 5, 1994, which is a continuation of abandoned U.S. patent application Ser. No. 07/782,109, filed Oct. 24, 1991, which is a continuation-in-part of U.S. patent application Ser. No. 07/467,541, filed Jan. 19, 1990, now U.S. Pat. No. 5,113,182, the disclosures of which are incorporated herein by reference.

BACKGROUND OF THE INVENTION

The present invention pertains to a remote vehicle programming system and, more particularly, a system for remotely reprogramming the manner in which a vehicle accessory is controlled.

As vehicle electronic systems and options become more sophisticated, vehicle owners have many new options for vehicle accessories from which to choose. The rapidly increasing number of new options has led to a nearly infinite number of combinations of options for vehicle accessories that are available. This extremely large number of combinations of vehicle accessories options existing on any one vehicle makes it much more difficult for a buyer to find a vehicle on a dealer's lot having the exact combination of vehicle accessory options that the buyer desires. Further, this wide array of vehicle accessory options that may exist in a particular vehicle increases the likelihood that no two drivers who share the vehicle will be able to agree on which options the vehicle should have. These concerns have given rise to the need for a programmable vehicle personalization system that allows an operator to select accessory operation for that vehicle according to their preferences at any time following the manufacture of the vehicle. U.S. Pat. No. 5,040,990 issued on Aug. 20, 1991 discloses one such system in which selected vehicle options can be programmed by the vehicle operator. U.S. Pat. No. 5,113,182 entitled VEHICLE SYSTEMS CONTROL issued May 12, 1992 also discloses a programmable vehicle personalization system. Although programmable vehicle personalization systems exist, there remains a need for a system that does not require extensive effort by the vehicle operator to reprogram the manner in which the vehicle's accessories are controlled.

SUMMARY OF THE INVENTION

The present invention provides vehicle personalization to be remotely effected by a service provider using a paging system. According to one aspect of the present invention, a vehicle owner wishing to reprogram a vehicle, calls the service provider who effects reprogramming of an option control by transmitting control signals to the vehicle from a land-based pager transmitter to receiver mounted in the vehicle. Thus, because the service provider effects vehicle personalization, the vehicle owner need not have any technical knowledge as to how to operate the vehicle programming system. Another aspect of the present invention is to provide vehicle personalization for each person who may operate the vehicle.

To achieve these aspects and other advantages, the vehicle accessory control system of the present invention includes a plurality of electrically operated vehicle accessories, a receiver to be mounted in a vehicle for receiving paging signals from a land-based paging transmitter, and a control circuit coupled to the receiver and to the vehicle accessories for controlling the operation of the vehicle accessories in accordance with a control program. The paging signals include an address uniquely identifying the vehicle and a reprogramming signal for reprogramming the operation of at least one of the vehicle accessories. The control circuit includes an input interface for receiving information regarding a plurality of sensed conditions, control means for controlling the operation of the vehicle accessories in accordance with the control program and in response to sensed conditions received from the input interface. The control circuit further includes reprogramming means for selectively reprogramming the control program in response to the detection of a paging signal including an address identifying the vehicle and the reprogramming signal, to selectively change the manner in which the control means controls the operation of at least one of the vehicle accessories.

These and other features, objects, and benefits of the invention will be recognized by those who practice the invention and by those skilled in the art, from reading the following specification and claims together with reference to the accompanying drawing figures.

DETAILED DESCRIPTION OF THE PREFERRED EMBODIMENTS

Figure 1:
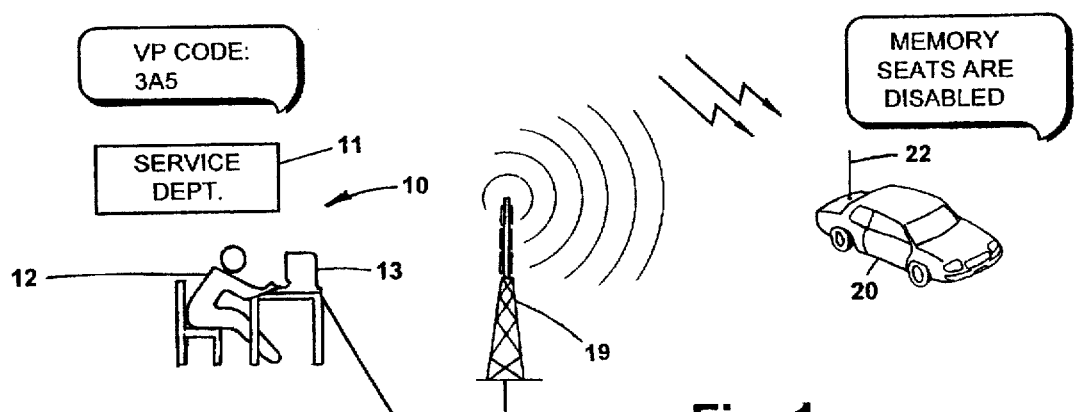
FIG. 1 is a schematic diagram of a system embodying the present invention.
Figure 2:
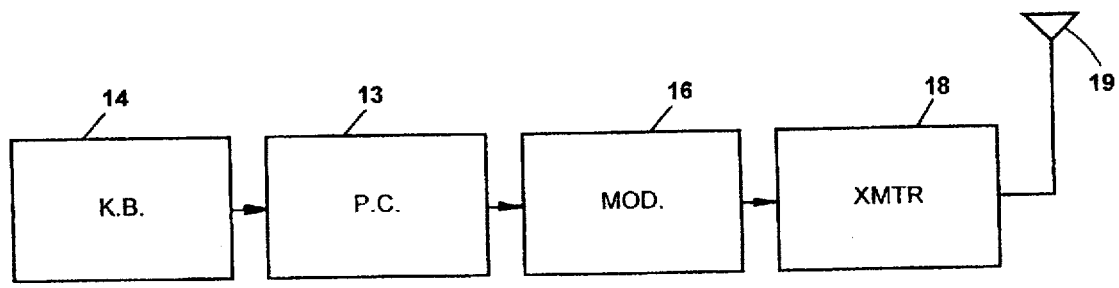
FIG. 2 is an electrical circuit diagram in block form of the land-based facility illustrated in FIG. 1.

Referring initially to FIG. 1, there is shown a land-based installation and vehicle embodying one preferred embodiment of the present invention. The land-based system is designed for controlling a variety of selectable vehicle options for a plurality of vehicles, each of which include the remotely programmable electrical control system of the present invention. The land-based facility 10 can be a car dealership, for example, or an independent facility which includes a service department 11 for providing the transmission of control signals to vehicles subscribed to the system, typically the service department of an automotive dealership from whom the vehicle 20 was purchased. The service department includes an operator 12 with access to a computer terminal 13 with a keyboard 14 (FIG. 2). The terminal can be a typical PC with an RS-232 data output port coupled to a modulator 16 in turn coupled to a transmitter 18 for transmitting address and control signals by an antenna 19 (FIGS. 1 and 2) to the receiving antenna 22 of a vehicle 20. It is understood that nationwide there will be a sufficient number of land-based facilities to service vehicles in the system. As satellite communications improve, it will be possible for a single facility to send such information using DBS (Direct Broadcast Satellite) in which the vehicle antenna is a satellite receiving antenna. Alternatively, satellite communications can be used as one link through several land-based relay stations.

In the system shown in FIG. 1, the operator 12 will receive a request from a vehicle owner, typically by a normal telephone request, that a certain vehicle option is either to be enabled or disabled. Such an operation may, for example, be the activation or deactivation of a "LAST DOOR LOCKS ALL DOORS" feature. The operator 12 responds to the request which identifies the vehicle either by owner or VIN number (or both) by entering in keyboard 14 the vehicle code which is typically an address associated with the particular vehicle and a reprogramming command associated with the requested personalization of the vehicle option change for such vehicle. This paging signal is transmitted by the service department using the equipment shown in FIG. 2 and received and demodulated by the vehicle system as described in greater detail below in connection with FIGS. 3 and 4, which responds to the reprogramming command to carry out the reprogramming control function.

A variety of modulation schemes can be used for the transmission of information between land-based facilities and vehicles, however, standard commercially available GSC or POCSAG paging systems are presently preferred. In the FIG. 1 schematic diagram shown, a reprogramming command can be two 23 bit words in the standard GSC paging format which uniquely identifies each vehicle in the system. Following the address for the vehicle, the actual reprogramming command data is sent, which in this paging format can be up to eight words or fifteen bits each. Other paging formats such as the POCSAG format can also be employed which also provides address code words and message code words. A description of these two formats are set forth in detail in Appendix A to this Specification.

Figure 3:
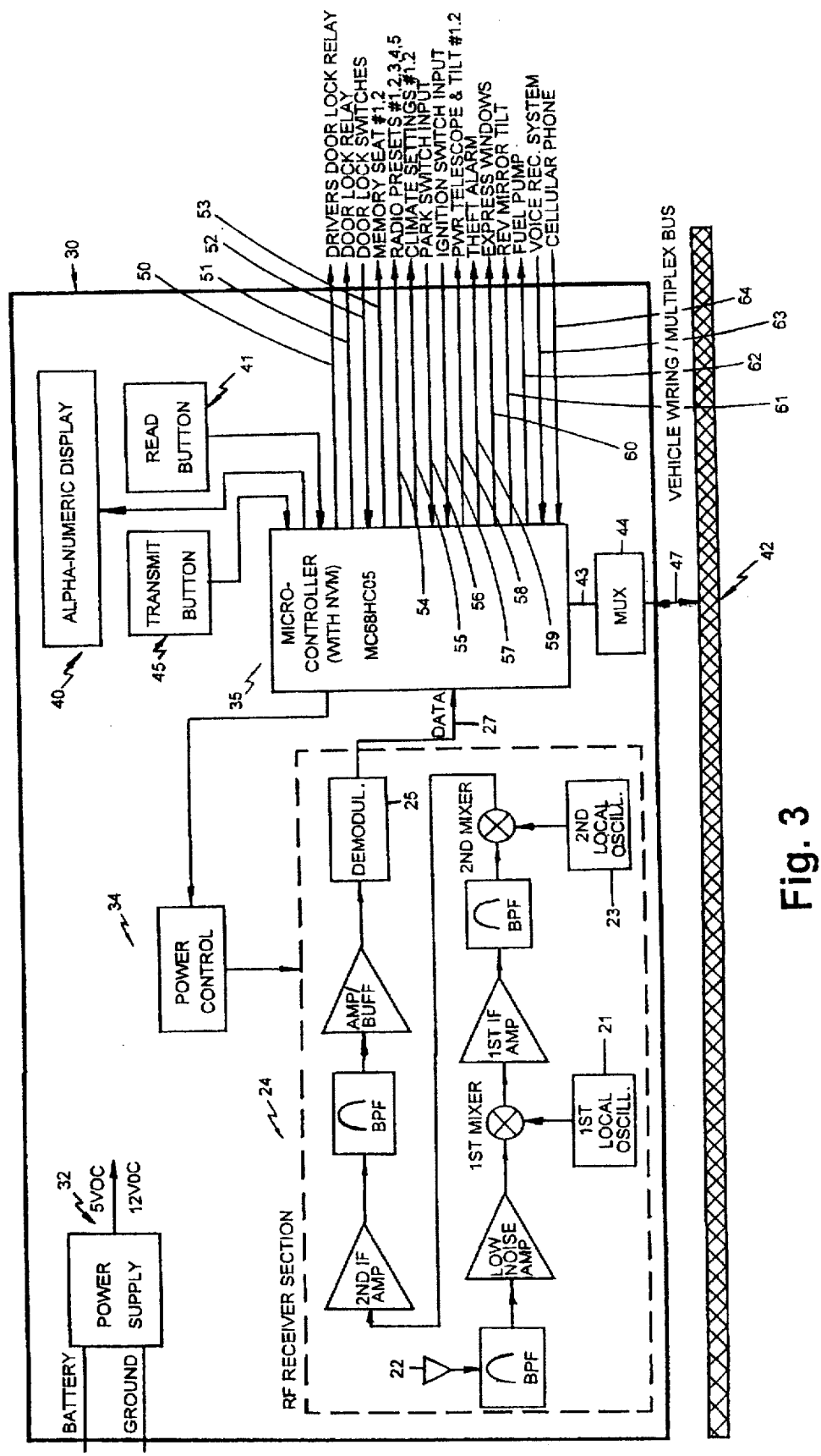
FIG. 3 is an electrical circuit diagram in block form of the vehicle electrical circuit embodying the present invention which is used in association with the system shown in FIGS. 1 and 2.

In the example shown in FIG. 1, the vehicle operator has requested that the memory seat be disabled and the necessary paging signal including the reprogramming command is transmitted to the vehicle electrical control system 30 shown in FIG. 3 which includes the vehicle antenna 22 and a receiver and demodulator shown by block 24 for receiving the vehicle address and reprogramming command and applying it to a microcontroller 35. Once received and decoded, the reprogramming command is executed as described below and an indication that the command has been received and executed is provided on the alpha-numeric display 40 in the vehicle.

In the installation shown in FIGS. 1 and 2, the modulator 16 responds to the vehicle identification code and the reprogramming command signal entered on keyboard 14 and transmitted by conventional commercially available modulator 16 and transmitter 18 to provide the desired address and reprogramming in either the GSC or POCSAG paging formats. Transmitter 18 typically operates on a frequency within the 137-175 MHz (VHF band) or within the 405-513 MHz (UHF band), while the modulator provides FM FSK tone modulation for the RF carrier signal to provide a composite output signal at transmitting antenna 19 which provides the address and reprogramming information to vehicles which are part of the system. Typically, the receiver will be an integral part of the vehicle when purchased, and the dealer can either include the options select control system as part of the vehicle cost or can provide it as a monthly subscription service to the vehicle owner. Access to the unique vehicle identification code address for controlling options, however, will typically only be available to the vehicle dealer or associated service centers.

The vehicle electrical control system 30, is shown in FIGS. 3 and 4, and include as shown in FIG. 3, a microcontroller 35 such as a Motorola MC68HC05, which receives demodulated signals from the receiver 24 shown enclosed within dotted lines in FIG. 3 via a data bus 27. The receiver 24 is a typical duo-conversion receiver having first and second local oscillators 21 and 23, appropriate bandpass filters and amplifiers, and a demodulator circuit 25 which provides digital data output on a data bus 27 to an input of microcontroller 35. Microcontroller 35 includes an integral non-volatile memory for retaining data when the vehicle is not in operation. In vehicles including a single wire multiplex bus 42, an output terminal 43 of microcontroller 35 is coupled to the input of a multiplex communication circuit 44 comprising a 28 pin integrated circuit which is coupled by output conductor 47 to a single wire data bus 42. The average data rate for the multiplex circuit 44 is 10.4 kilobits per second. Microcontroller 35 communicates with circuit 44 through its SPI serial interface port 43. When circuit 44 receives a message over the bus 42, it interrupts the microprocessor, which in turn initiates communication with the circuit through its SPI port. Microprocessor 35 then reads the data from the SPI register and acts upon the information. The multiplexing scheme is set forth in SAE standard J1850 and is universally used in the automotive industry.

The vehicle control system 30 includes a power supply 32 which supplies regulated 5 and 12 volt DC to the various individual circuit blocks shown in FIGS. 3 and 4 with the conventional power circuit interconnections not being shown for the sake of simplification of the drawings. Circuit 30 also includes a power control circuit 34 which is coupled to power supply 32 and between the microcontroller and receiver 24 to selectively activate and deactivate the receiver periodically in order to save power as described in greater detail below in connection with the flow diagram of FIG. 5. The vehicle electrical control circuit 30 further includes an alpha-numeric vacuum fluorescent-type display circuit 40 which is coupled to the microcontroller 35. Display circuit 40 includes suitable driver circuits as well as the display itself. A pushbutton lead switch 41 is coupled to microcontroller and a transmit control pushbutton switch 45 is also coupled to microcontroller 35. As will be described below, switches 41 and 45 are operator actuated switches which selectively scroll the information displayed on the display 40 and allow memory control of such information. In the case of an automatic phone dialing system, the transmit switch 45 can be employed for activating a sequence of controls which cause a cellular telephone, if installed in the vehicle, to automatically dial a number displayed on the vacuum fluorescent display 40.

Figure 4A:
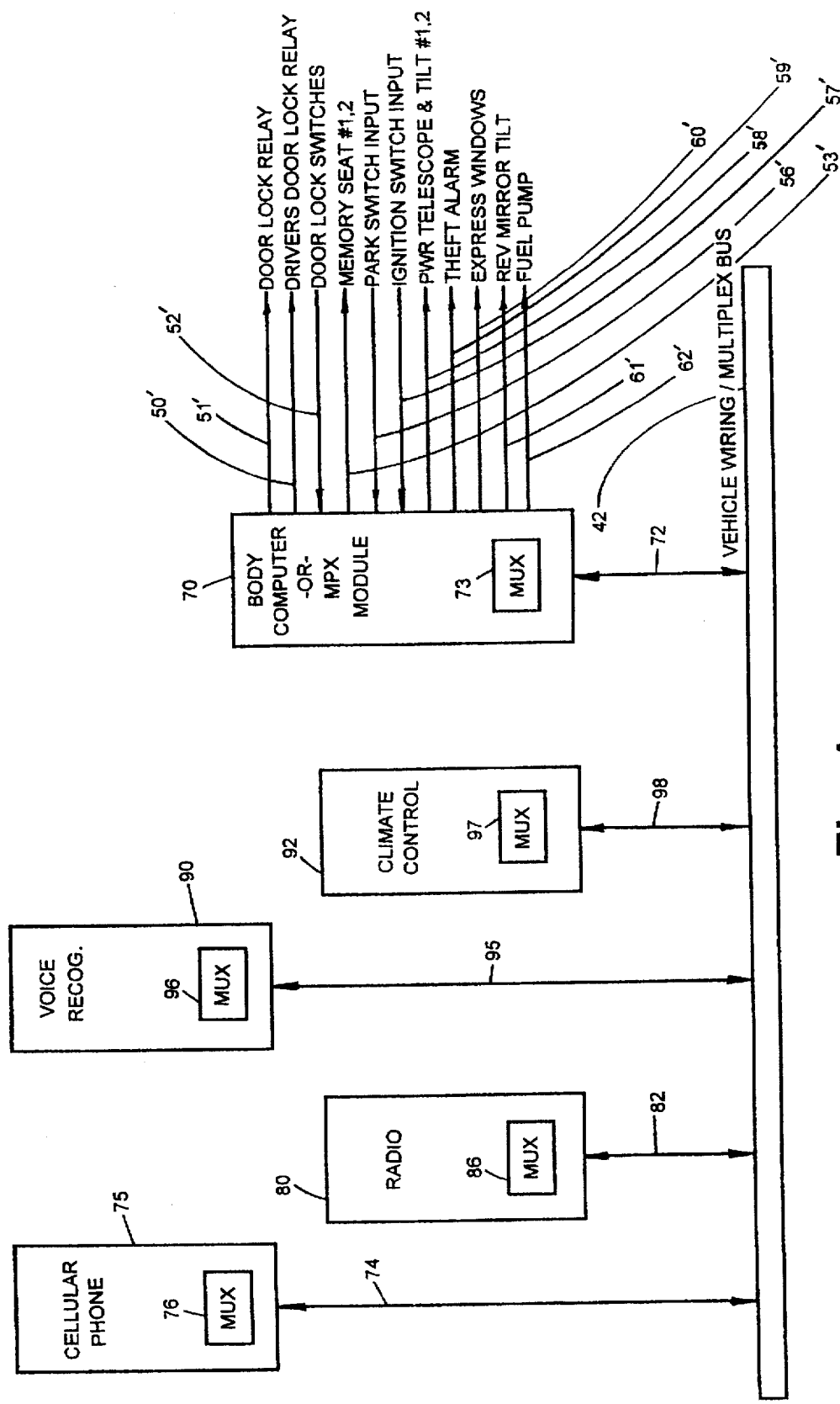
FIGS. 4a and 4b are electrical circuit diagrams in block form of an optional interface circuit associated with the electrical circuit shown in FIG. 3.
Figure 4B:
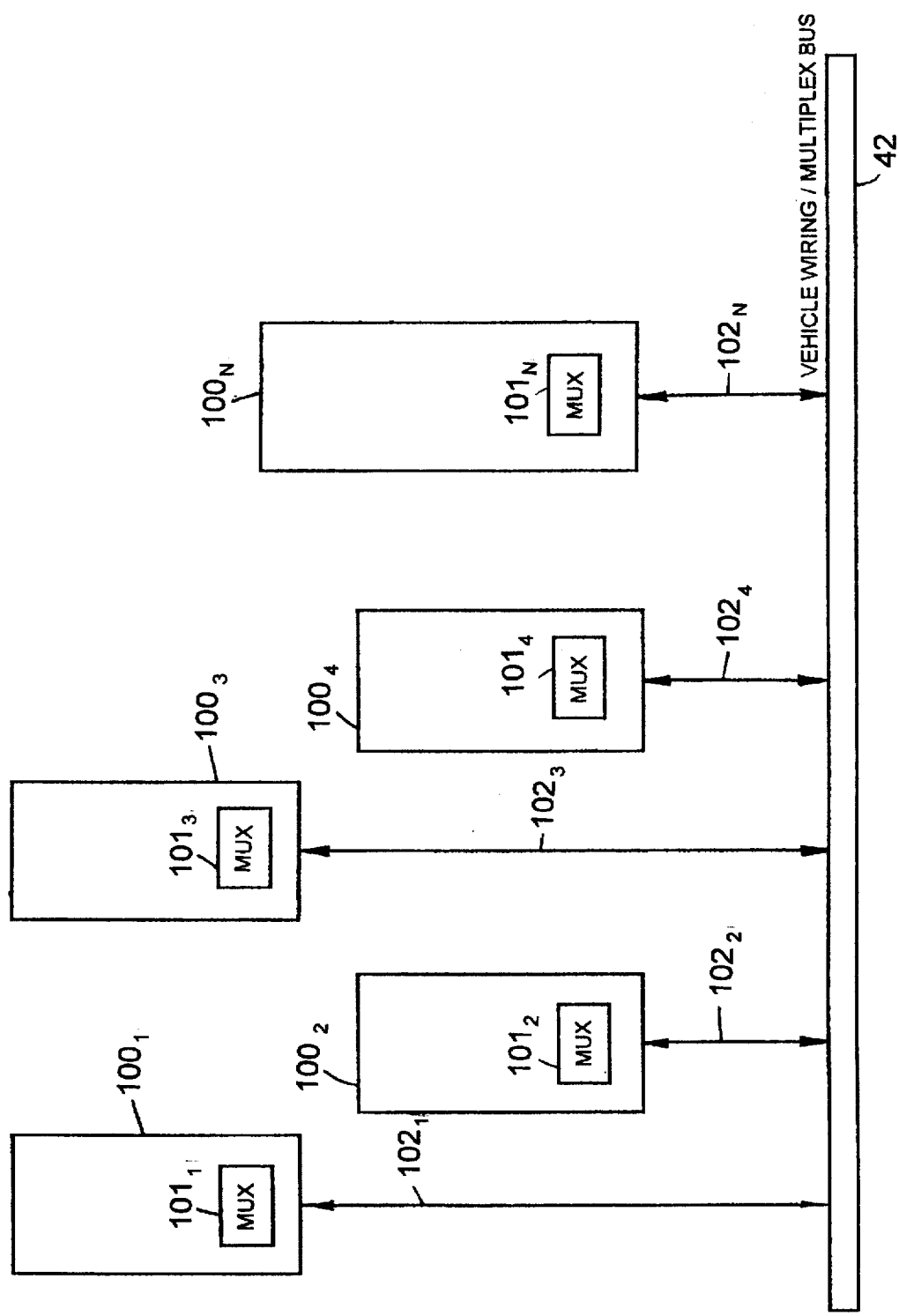

Coupled to the microcontroller are a plurality of input/output ports 50–64 which provide control output signals or receive input status signals from a variety of vehicle interface controls and circuits identified in the drawings. Depending upon the specific microcontroller used, conventional interface circuits between the microcontroller and the input/output lines 50–64 may be required as is well known in the art. In the system shown in FIG. 3, the output terminals 50–64 can be coupled directly to one or more of the variety of control systems shown such as the electrical fuel pump system shown by data bus 62, the ignition switch input 56, and the like. Similarly, instead of directly coupling the microcontroller as shown through the data buses 50–64, many vehicles will include a single wire data bus 42, which as seen in FIGS. 4a and 4b, intercouples the same control information from microcontroller 35 in receipt of information through the data bus 42 instead of directly through conductors 50–64. In this instance, many of the conductors 50–64 can be eliminated and the controls are accomplished through an interface microcontroller 70 of the type disclosed in U.S. Pat. No. 5,113,182, the disclosure of which is incorporated herein by reference. For the sake of comparison, the output conductors of microcontroller 70 corresponding to those of microcontroller 35 are identified by similar reference numerals carrying a superscript prime symbol. Thus, the vehicle control circuit 30 shown in FIGS. 3 and 4 will be capable of communicating through the data bus 42 or directly from microcontroller 35 to the various interface controls. Microcontroller 70 is coupled by conductor 72 to bus 42 through a multiplex chip 73 of the same type as circuit 44 to provide two-way communication between the two microcontrollers. In the event it communicates through the data bus 42, additional control circuits as now described are employed.

In the FIG. 4 embodiment of the control circuit 30, a cellular phone 75 (FIG. 4a) is mounted in the vehicle and communicates with bus 42 through a data link 74 and a multiplex interface chip 76. Similarly, the vehicle includes an AM/FM radio 80 coupled to bus 42 through data line 82 and also includes a multiplex interface chip 86. The vehicle may include a voice recognition system 90 of the type described in U.S. Pat. No. 4,827,520, issued May 2, 1989, and entitled VOICE ACTUATED CONTROL SYSTEM FOR USE IN A VEHICLE, the disclosure of which is incorporated herein by reference. In the event the system includes such a voice recognition and control system, data bus 42 is employed in connection with the voice recognition circuitry which operates in conjunction with microcontroller 70 to provide the desired control of the various vehicle functions. Voice recognition circuit 90 is coupled to a multiplex circuit 96 and conductor 95 to bus 42. The vehicle may also include an electronic climate control system 92 which has a multiplex interface chip 97 which couples to bus 42 via the conductor 98. As shown in FIG. 4b, the vehicle may also include a plurality of other control modules $100_1$–$100_N$ each associated with a controlled vehicle accessory and having a multiplex interface chip $101_1$–$101_N$ coupled to bus 42 via conductors $102_1$–$102_N$, respectively. Control modules $100_1$–$100_N$ may be associated with one or more of the following vehicle accessories in various combinations thereof. The associated vehicle accessories may include: a door locking actuator for each door; a window opening actuator for each movable window; a sunroof actuator; vehicle headlights; horn; seat position actuators; seat heaters; mirror position actuators; a rearview mirror reflectivity adjusting circuit; a compass; vehicle gauges; vehicle displays; interior lighting; a rear defrost circuit; a fuel door locking mechanism; a trunk locking mechanism; and various circuits for producing an audible chime within the vehicle's interior.

In addition to those inputs to microcontroller 35 or microcontroller 70 as shown in FIGS. 3 and 4, respectively, various other input signals may be provided including input signals from the following: each of the window switches; a circuit for detecting whether a key is in the ignition; a speedometer; an RPM detecting circuit; a battery voltage detecting circuit; a fuel level sensor; the turn signal circuit; ambient light sensors; a reverse gear switch input; a drive gear switch input; a park gear switch input; a rain sensor; an interior thermometer; an exterior thermometer; an engine temperature sensor; an oil pressure sensor; a rear defrost switch; door open/closed sensors; a driver's exterior door lock sensing circuit; and a headlight switch. As will be apparent from the following description of the operation of the foregoing system, microcontroller 35 and microcontroller 70 utilize various combinations of these input signals to control the various vehicle accessories associated with the control modules connected to multiplex bus 42 in a manner defined by a control program stored in a non-volatile memory of the respective microcontroller.

FIGS. 5–15 show an example of a main control program and its various subroutines that may be used to control the operation of various combinations of vehicle accessories. Upon reading this Specification, those skilled in the art will recognize that such a control program may be implemented in many different forms taking into account the large number of possible combinations of vehicle accessories that the main control program is responsible for controlling. Further, those skilled in the art will recognize that various functions of the exemplary main control program may be delegated to microcontroller 70 and/or the various control modules associated with the vehicle accessories. In general, the main control program utilizes a modifiable data structure to determine which of several possible subroutines to execute in response to a given input signal. As exemplified in the main control program as described below, such a data structure may take the form of a plurality of tables, each associated with one of several vehicle operators, including a plurality of entries corresponding to flags read from these tables by the main control program to determine the desired accessory control operations to be executed in association with the current vehicle operator.

Figure 5A:
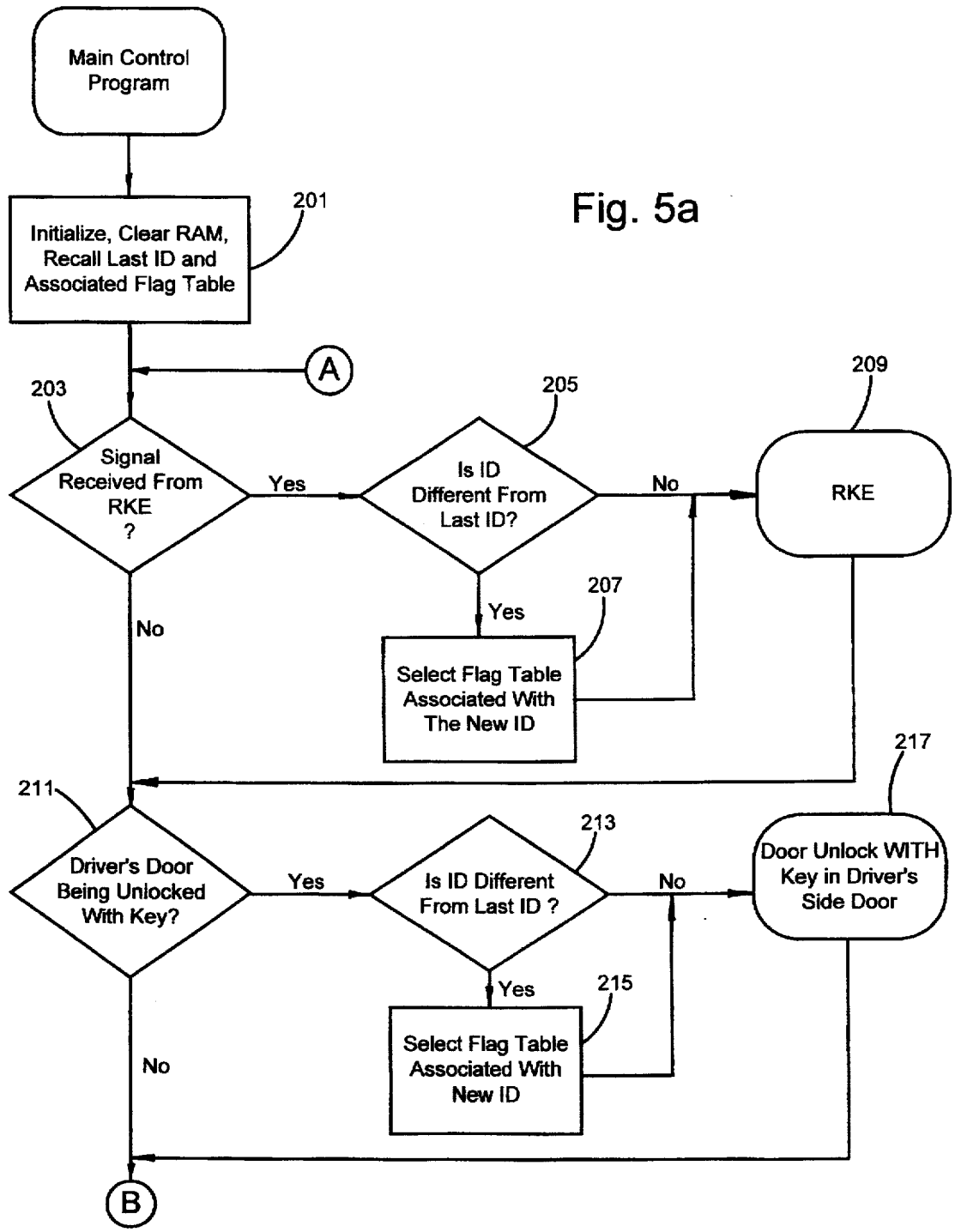
FIGS. 5a–5k are flow diagrams of the main control program employed with the microprocessor shown in FIG. 3.

Referring to FIG. 5a during system initialization, microcontroller 35 begins the execution of the main control program by clearing its RAM, recalling the last user ID by reading the same from the non-volatile memory, and reading a flag table associated with the last ID (step 201). Initially, the associated flag table may be set in the factory or by the dealer to specify default values. As described below, the flags in the flag table may subsequently be modified by a reprogramming signal included in a paging signal having the vehicle's ID.

Following initialization, microcontroller 35 periodically wakes from a sleeping state to turn on its RF receiver to determine whether a signal is received from a remote keyless entry (RKE) transmitter (step 203). If the RKE transmitters associated with the vehicle each transmit different user IDs, microcontroller 35 may be programmed to read the ID from the signal transmitted from the RKE transmitter and compare the received ID with that stored in memory in association with the last user ID (step 205). If a new ID has been received, microcontroller 35 selects the flag table associated with the new ID and sets a new ID flag for subsequent reference (step 207) prior to executing an RKE subroutine (step 209). On the other hand, if the received ID is the same as the last ID, or if the transmitted signal does not include a user ID, microcontroller 35 proceeds directly to the steps defining the RKE subroutine 209.

Figure 6A:
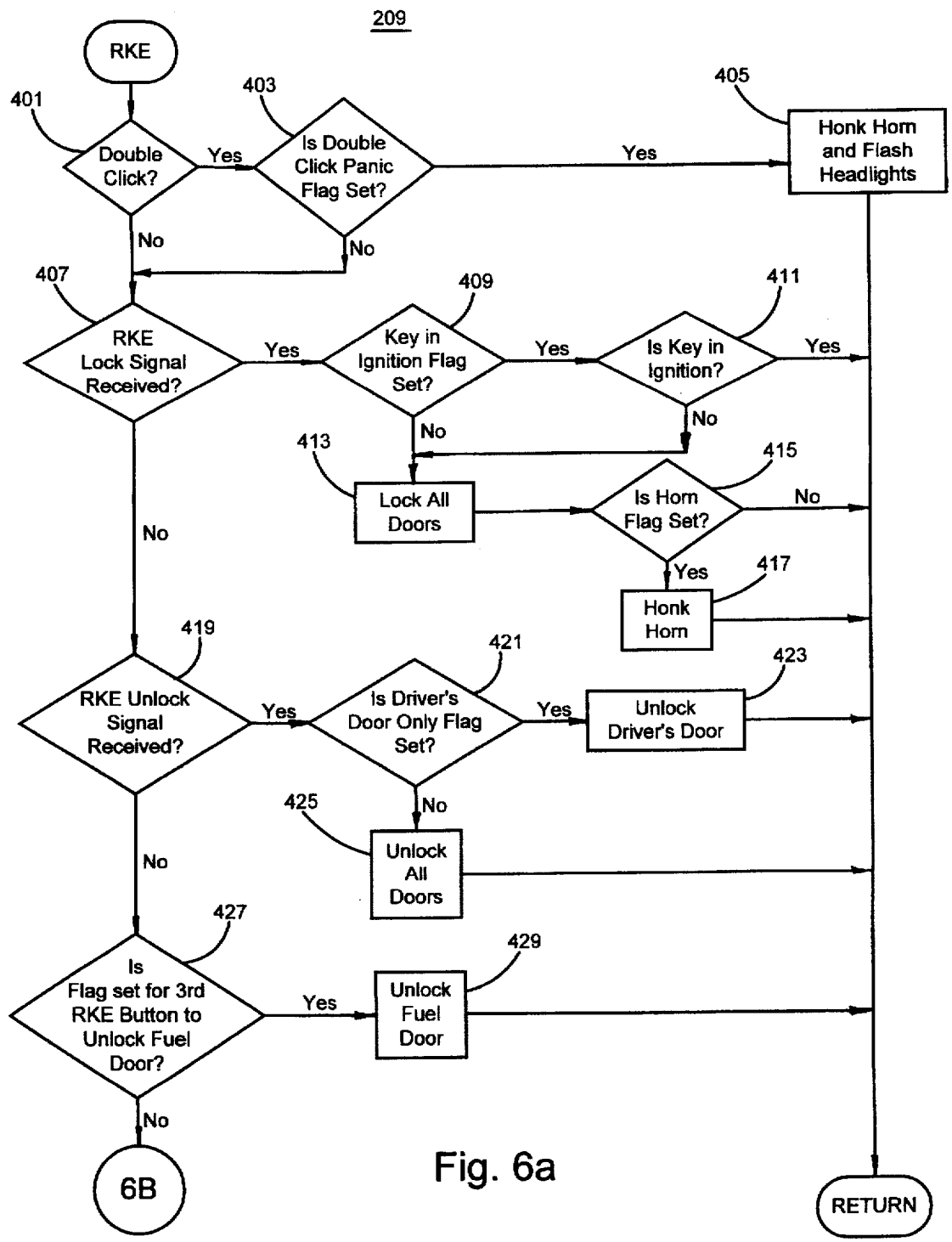
FIGS. 6a and 6b are flow diagrams of a first subroutine that may be called by the main control program.
Figure 6B:
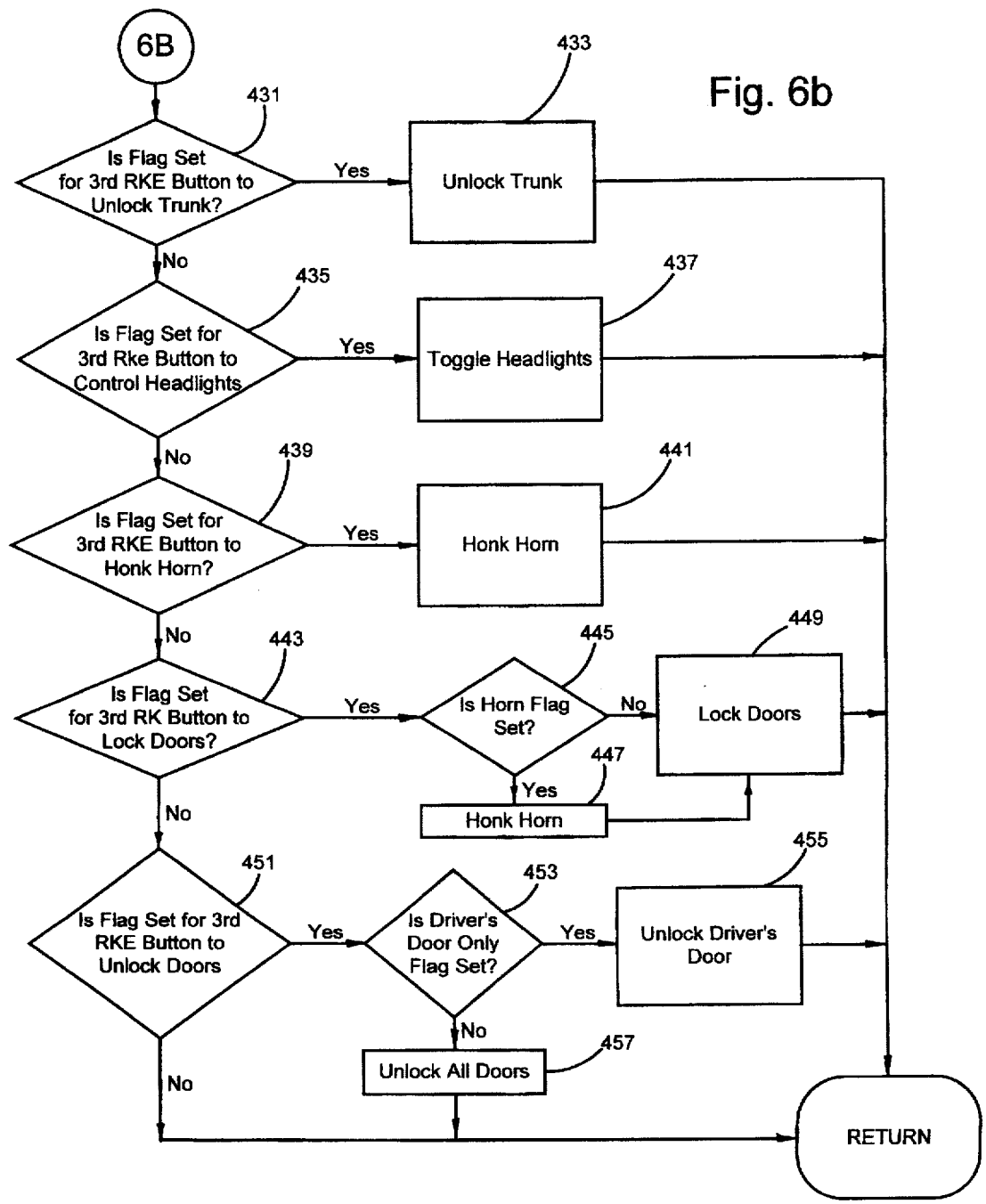

Referring to FIGS. 6a and 6b, which show the steps performed in RKE subroutine 209, microcontroller 35 first will determine whether the person activating RKE transmitter double-clicked any of the RKE transmitter buttons (step 401). If microcontroller 35 detects a double-click, it then checks a predefined location within the flag table associated with the user ID to determine whether a flag has been set to instruct microcontroller 35 to perform a panic routine in which microcontroller 35 responds to a double-click by honking the horn and flashing the headlights (step 405) prior to returning to the main control program at step 211 (FIG. 5a). If microcontroller 35 does not detect a double-click, or if the double-click panic flag is not set, microcontroller 35 determines whether the signal received from the RKE transmitter corresponds to a door lock signal (step 407).

In the example shown in FIG. 6a, there are two options that may be set to change the manner by which the microcontroller 35 controls the vehicle accessories in response to an RKE lock signal. The first option prevents the user from locking the vehicle when a key is detected in the ignition. To implement this option, the RKE subroutine 209 first checks whether the associated flag has been set in the flag table (step 409) and then checks whether an input signal is received from an ignition key sensor (step 411). If a key is in the ignition, microcontroller 35 will not lock the doors and will proceed to step 211 in the main control program. If a key is not in the ignition, or if the flag is not set for this option, microcontroller 35 proceeds to lock all the doors of the vehicle (step 413).

The second option associated with an RKE lock signal is to honk the horn after the doors have been locked as a confirmation to the vehicle operator. Thus, after locking all the doors in step 413, microcontroller 35 next determines whether the flag associated with this second option has been set (step 415). If the flag has not been set, microcontroller proceeds to execute step 211 in the main control program and the routine for honking the horn after locking all the doors would remain a dormant subroutine which could not be executed unless the flag associated with this option has been set in the flag table associated with the user.

If in step 407, microcontroller 35 determines that the transmitted RKE signal is not a lock signal, it will then determine whether the receive signal is an unlock signal (step 419). If the receive signal is an unlock signal, microcontroller 35 determines whether a flag has been set to instruct microcontroller 35 to unlock the driver's door (step 421). If the flag has been set, microcontroller 35 only unlocks the driver's door in response to the RKE unlock signal (step 423). However, if this flag has not been set, microcontroller 35 unlocks all the doors in response to a received RKE unlock signal (step 425).

RKE subroutine 209 provides for several selectable control routines that microcontroller 35 may execute in response to receiving an RKE signal from a third button on the RKE transmitter. Thus, if in steps 407 and 419, microcontroller 35 determines that the received RKE signal is not a lock or unlock signal, it assumes the receive signal is associated with a third RKE button and determines in steps 427, 431, 435, 439, 443, and 451 which control operation is to be performed in response to the received RKE signal by checking the associated flags at predetermined locations in the flag table. In response to a signal corresponding to the third RKE button, microcontroller 35 may unlock the fuel door (step 429), unlock the trunk (step 433), turn on and off the headlights (step 437), honk the horn (step 441), lock the doors (step 449), or unlock either the driver's door (step 455) or all the doors (step 457). If the flag is set for the third RKE button to lock the doors, microcontroller 35 may determine whether the flag is set (step 445) to honk the horn (step 447) to confirm that all the doors have been locked (step 449). Further, if the flag is set for the third RKE button to unlock the doors, microcontroller 35 can determine whether to unlock only the driver's door or all the doors by checking whether a flag is set in the flag table (step 453).

Referring back to FIG. 5a, if microcontroller 35 determines in step 203 that a signal has not been received from a RKE transmitter, or following completion of the RKE subroutine 209, microcontroller 35 checks whether an input is received from a circuit detecting whether the driver's door is being unlocked from the exterior with a key (step 211). If a user ID may be input from a keypad on the exterior surface of the door or from a key itself, microcontroller 35 determines whether a detected ID is different from the last ID stored in memory (step 213). If the ID is not different, microcontroller 35 selects the flag table associated with the last ID stored in memory and proceeds to execute subroutine 217. Otherwise, microcontroller 35 selects a flag table associated with the new ID (step 215) prior to executing subroutine 217.

Figure 7:
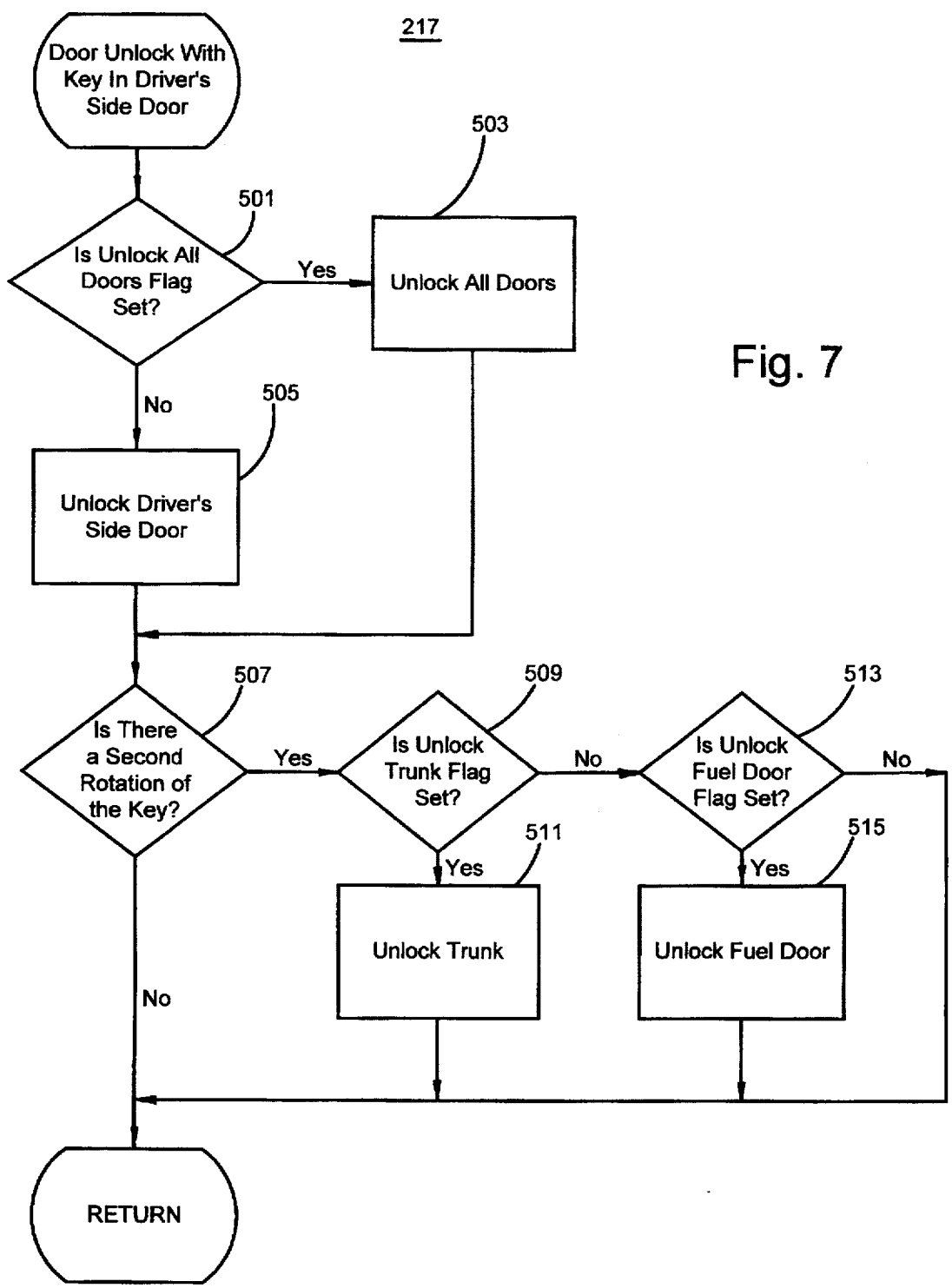
FIG. 7 is a flow diagram of a second subroutine that may be called by the main control program.
Figure 8A:
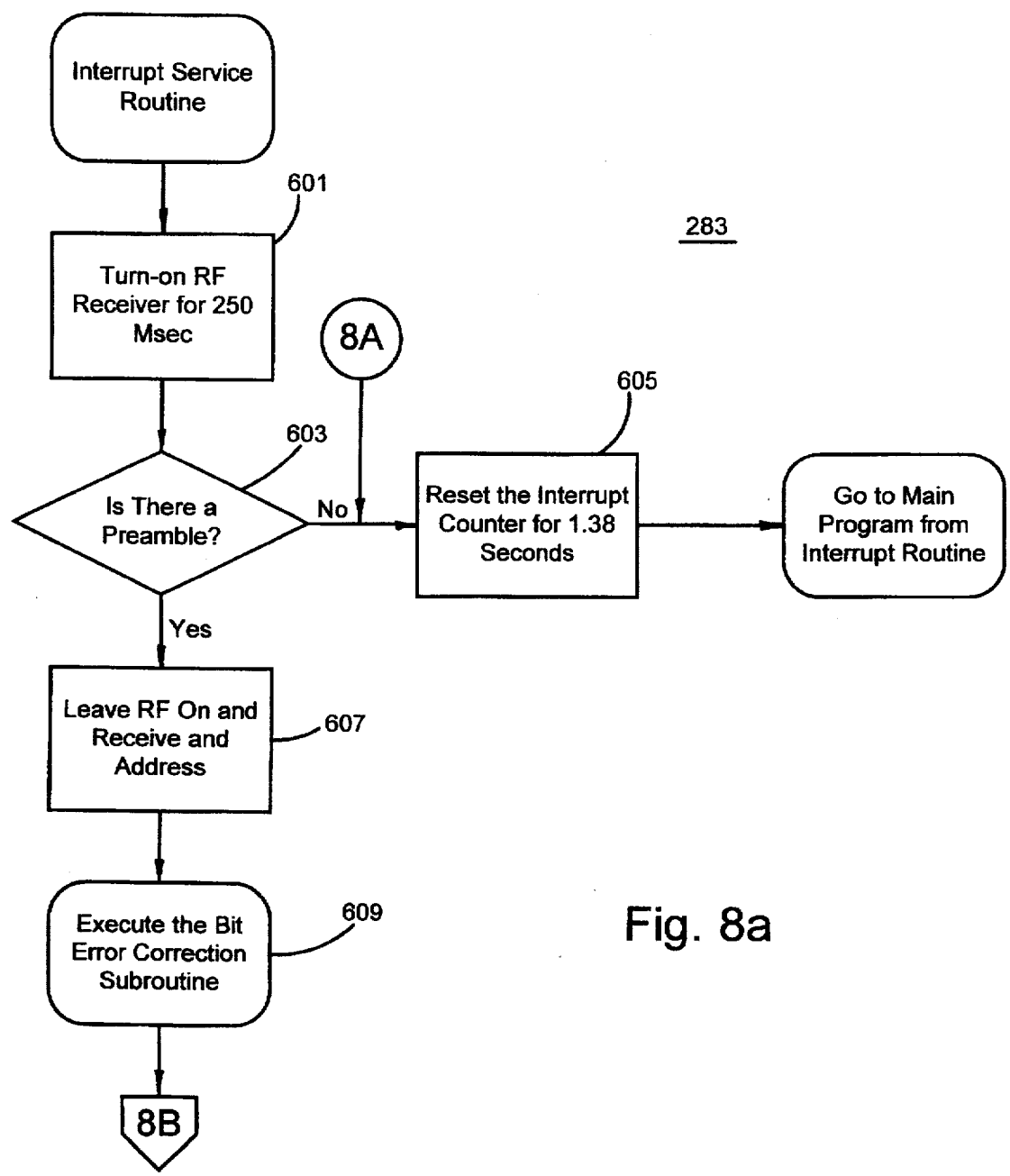
FIGS. 8a and 8b are flow diagrams of a third subroutine that may be called by the main control program.
Figure 8B:
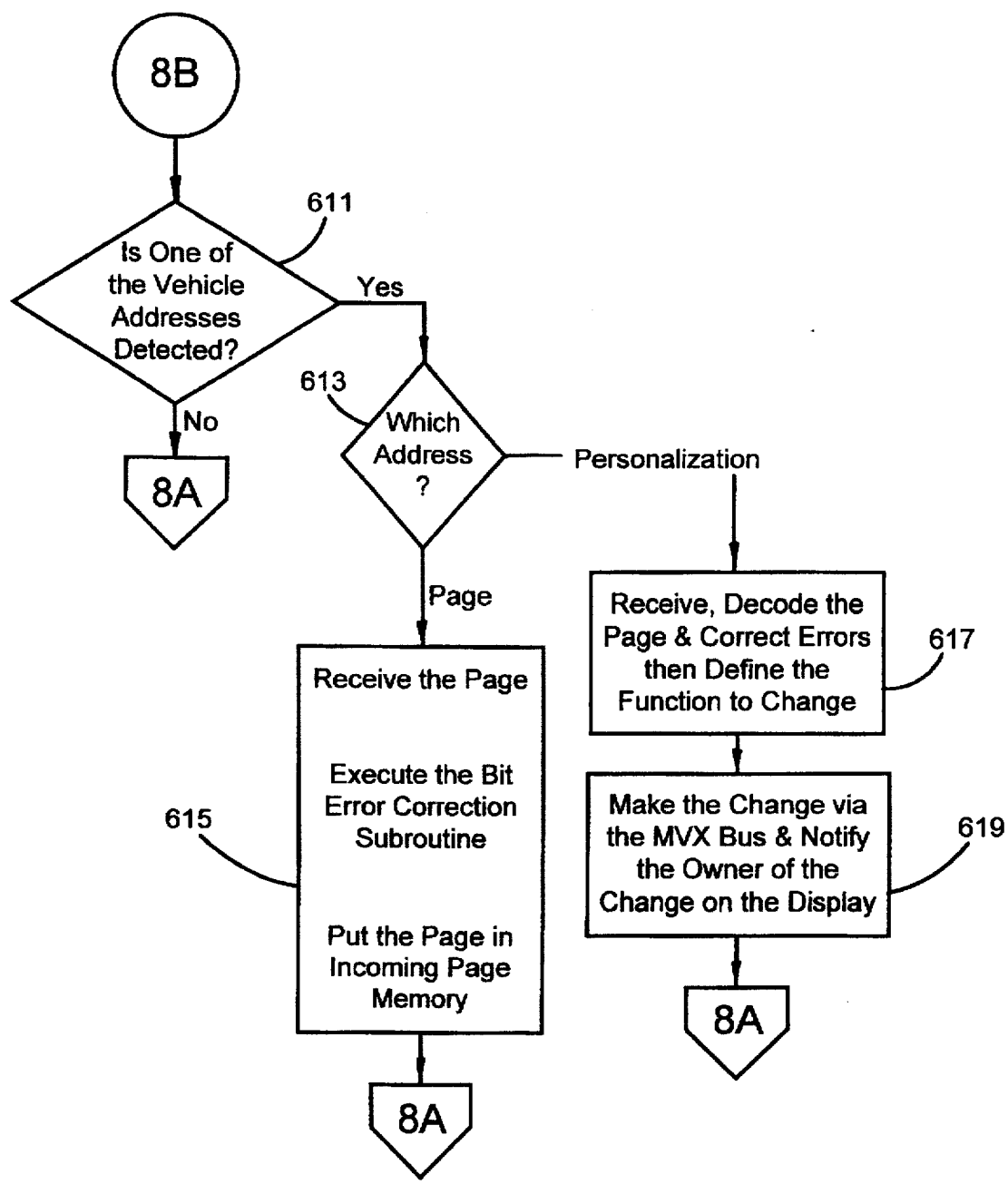
Figure 9:
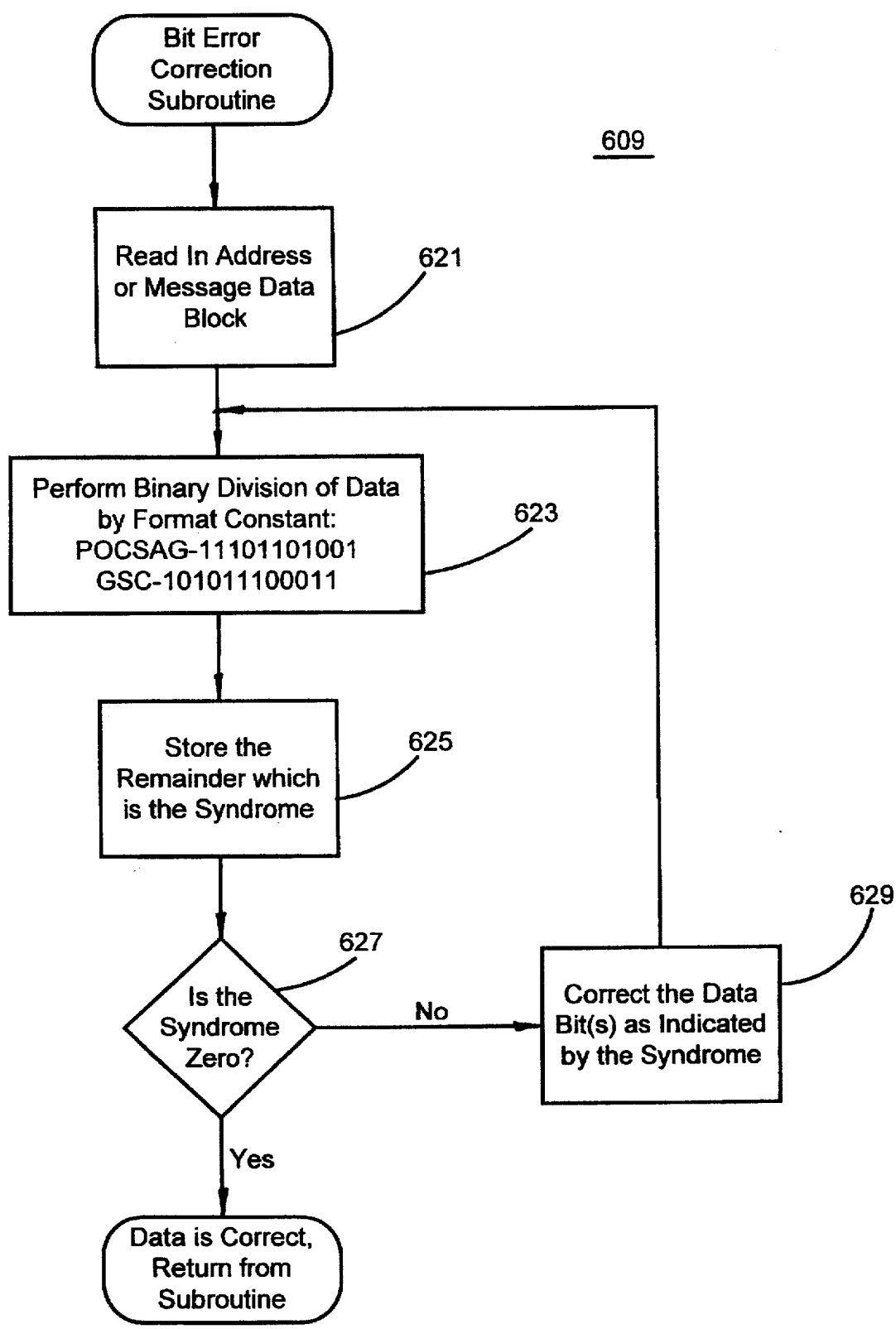
FIG. 9 is a flow diagram of a subroutine that may be called by the third subroutine.
Figure 10:
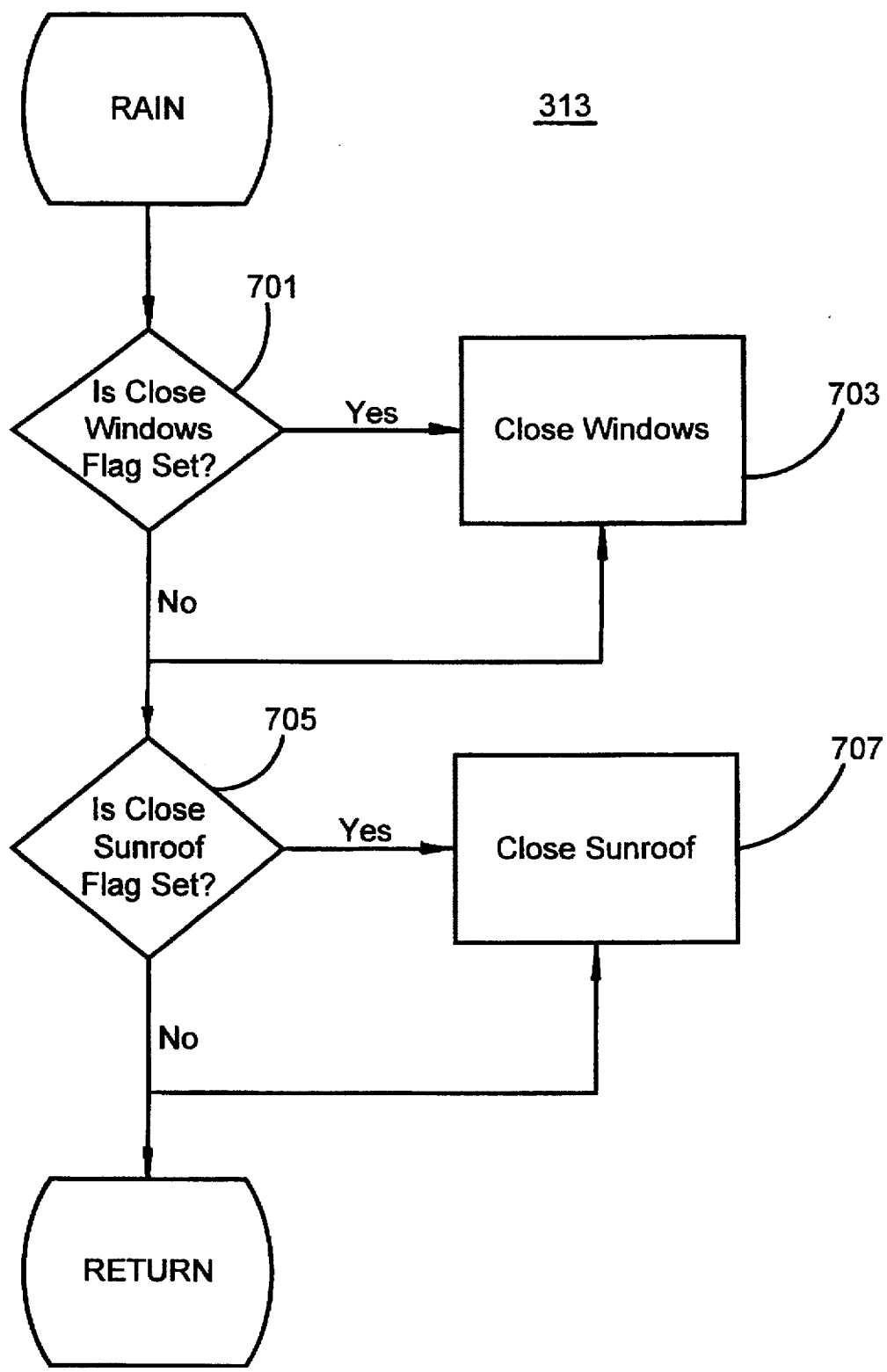
FIG. 10 is a flow diagram of a fourth subroutine that may be called by the main control program.
Figure 11:
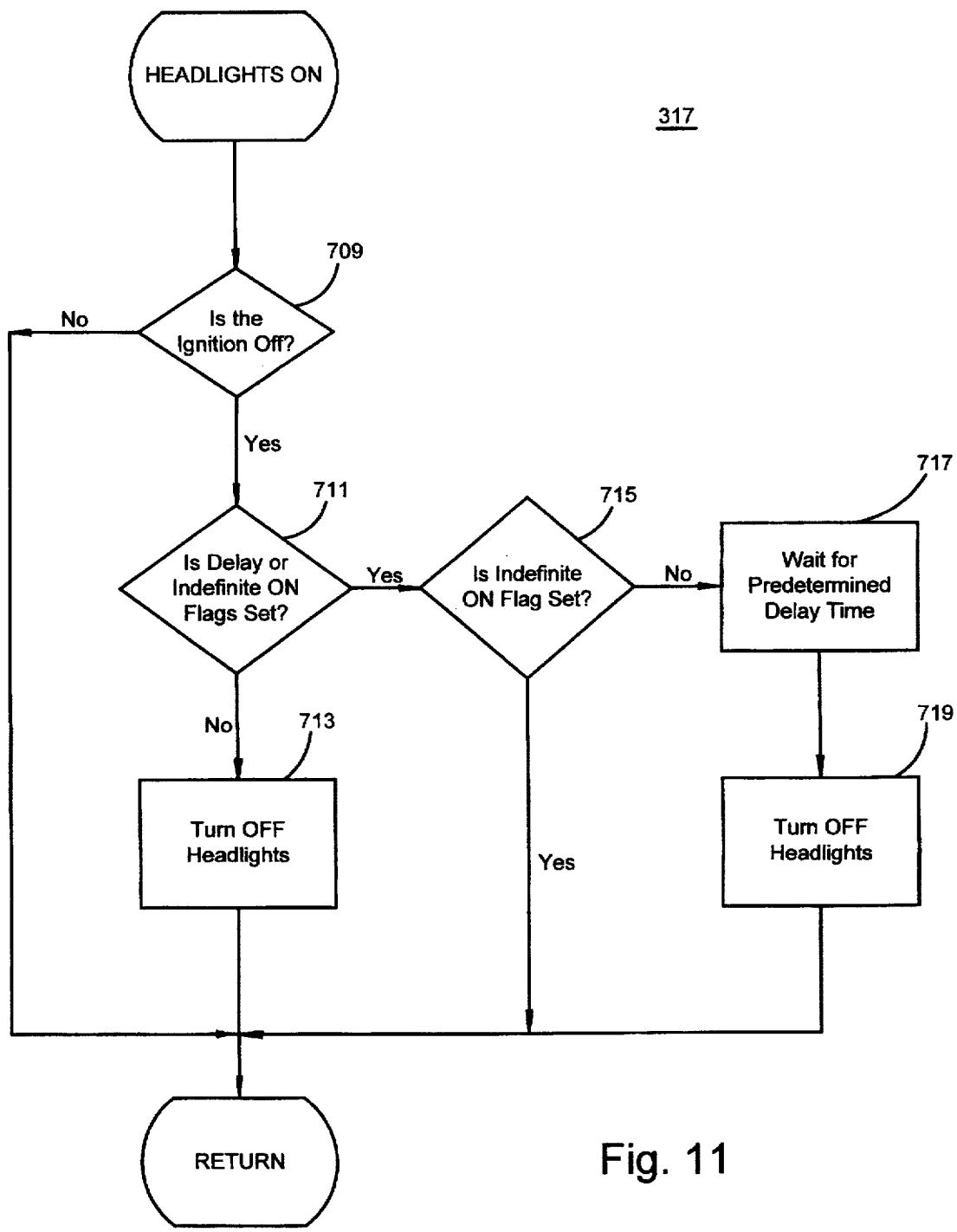
FIG. 11 is a flow diagram of a fifth subroutine that may be called by the main control program.
Figure 12:
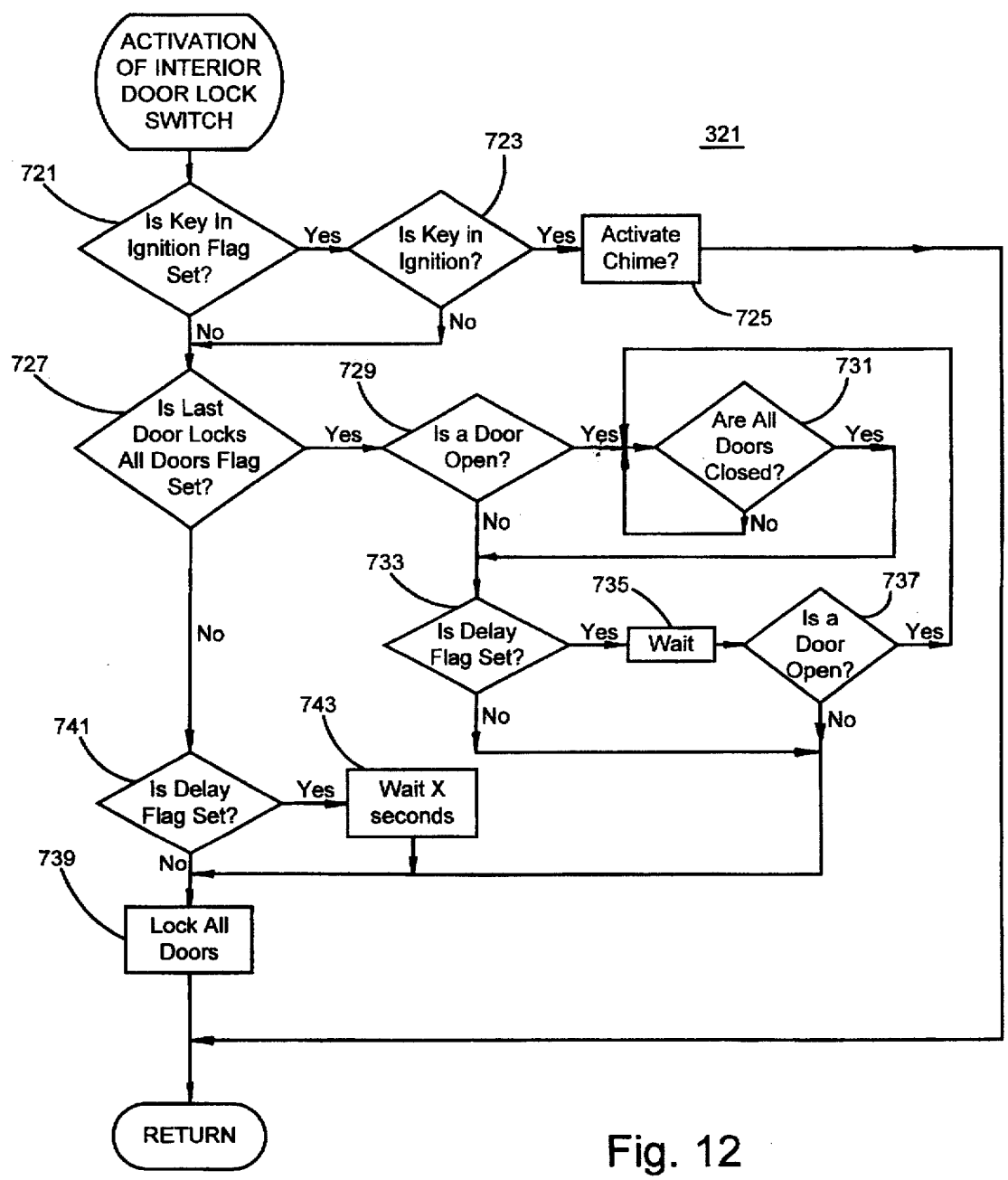
FIG. 12 is a flow diagram of a sixth subroutine that may be called by the main control program.
Figure 13:
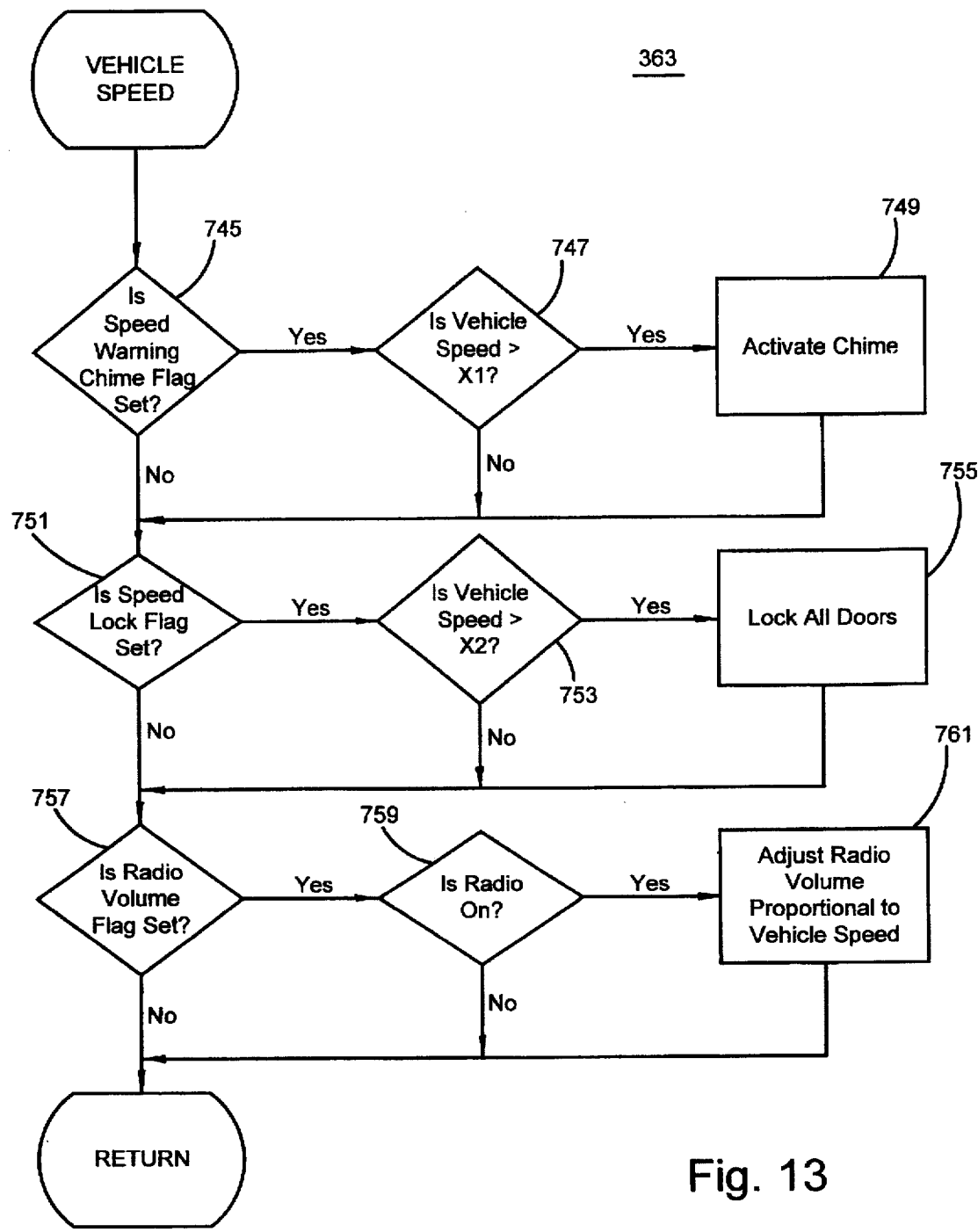
FIG. 13 is a flow diagram of a seventh subroutine that may be called by the main control program.
Figure 14:
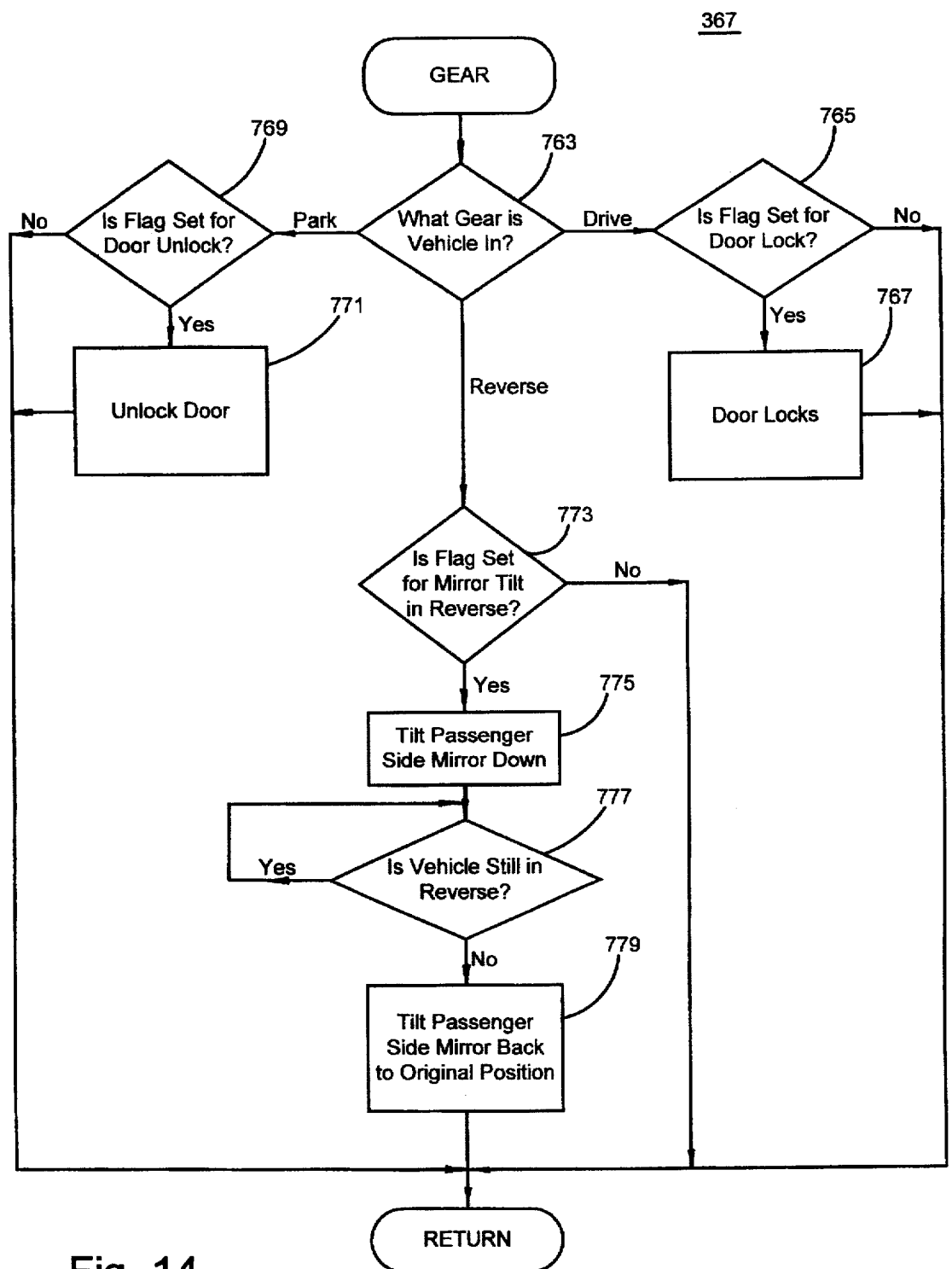
FIG. 14 is a flow diagram of a eighth subroutine that may be called by the main control program.

Subroutine 217 is shown in FIG. 7 and begins with step 501 in which microcontroller 35 checks whether an unlock all doors flag has been set. If this flag has been set, microcontroller 35 unlocks all the vehicle's doors (step 503) in response to a door unlock signal received through the keyslot or keypad on the exterior of the driver's door. Alternatively, if the unlock all doors flag is not set, microcontroller 35 unlocks only the driver's door (step 505).

In association with the keyslot on the driver's door, three different options may be selected upon a detection of a second rotation of the key in the keyslot (step 507). If an unlock trunk flag is set (step 509), microcontroller 35 unlocks the trunk (step 511). If the unlock trunk flag is not set, but an unlock fuel door flag is set (step 513), microcontroller 35 may unlock the fuel door (step 515). If neither the unlock trunk or the unlock fuel door flags are set, microcontroller 35 may do nothing in response to a detection of a second rotation of the key in the keyslot. If a second rotation is not detected, or after the preprogrammed function has been executed, microcontroller 35 proceeds to execute step 219 in FIG. 5b.

Figure 5B:
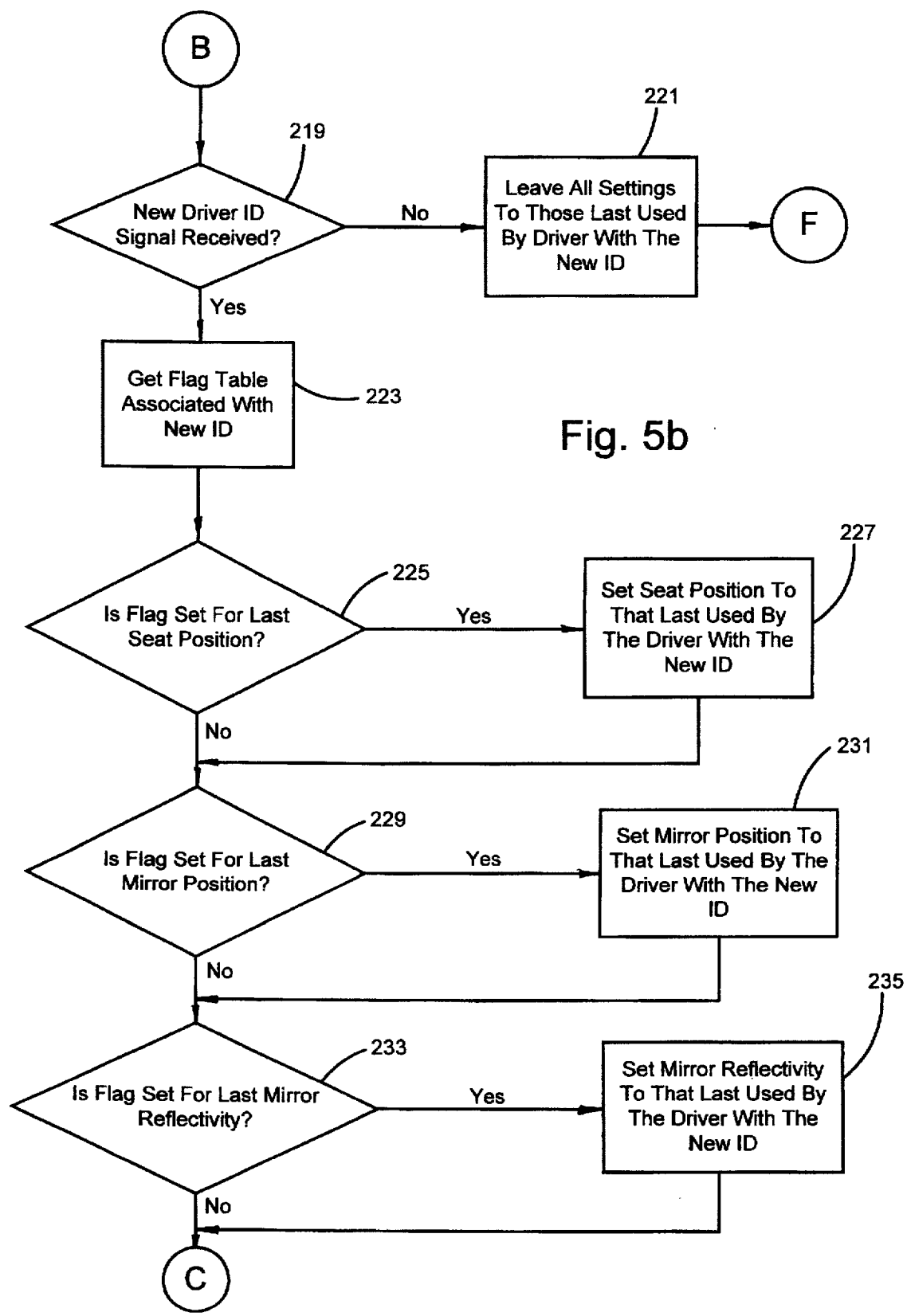
Figure 5C:
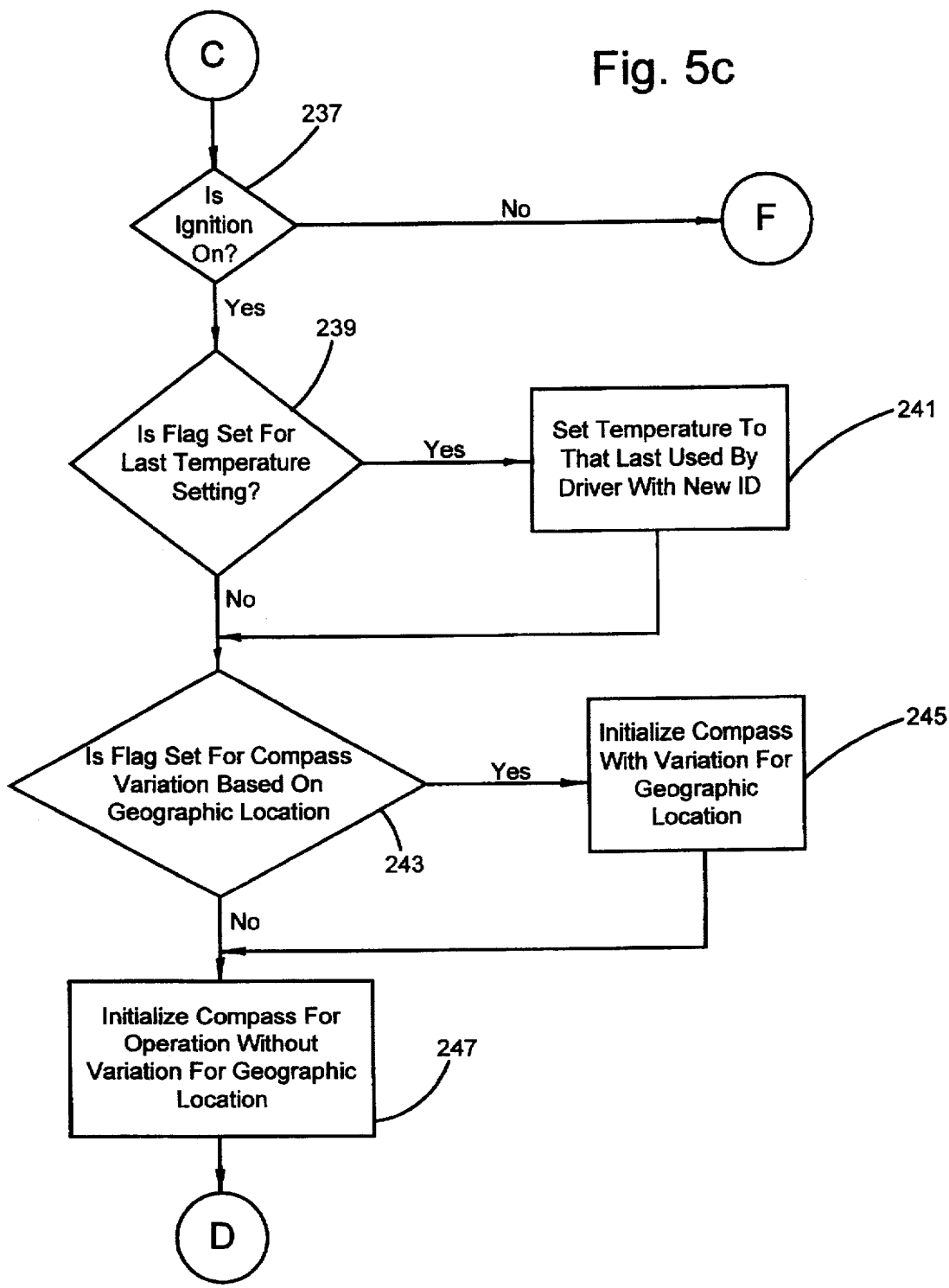
Figure 5D:
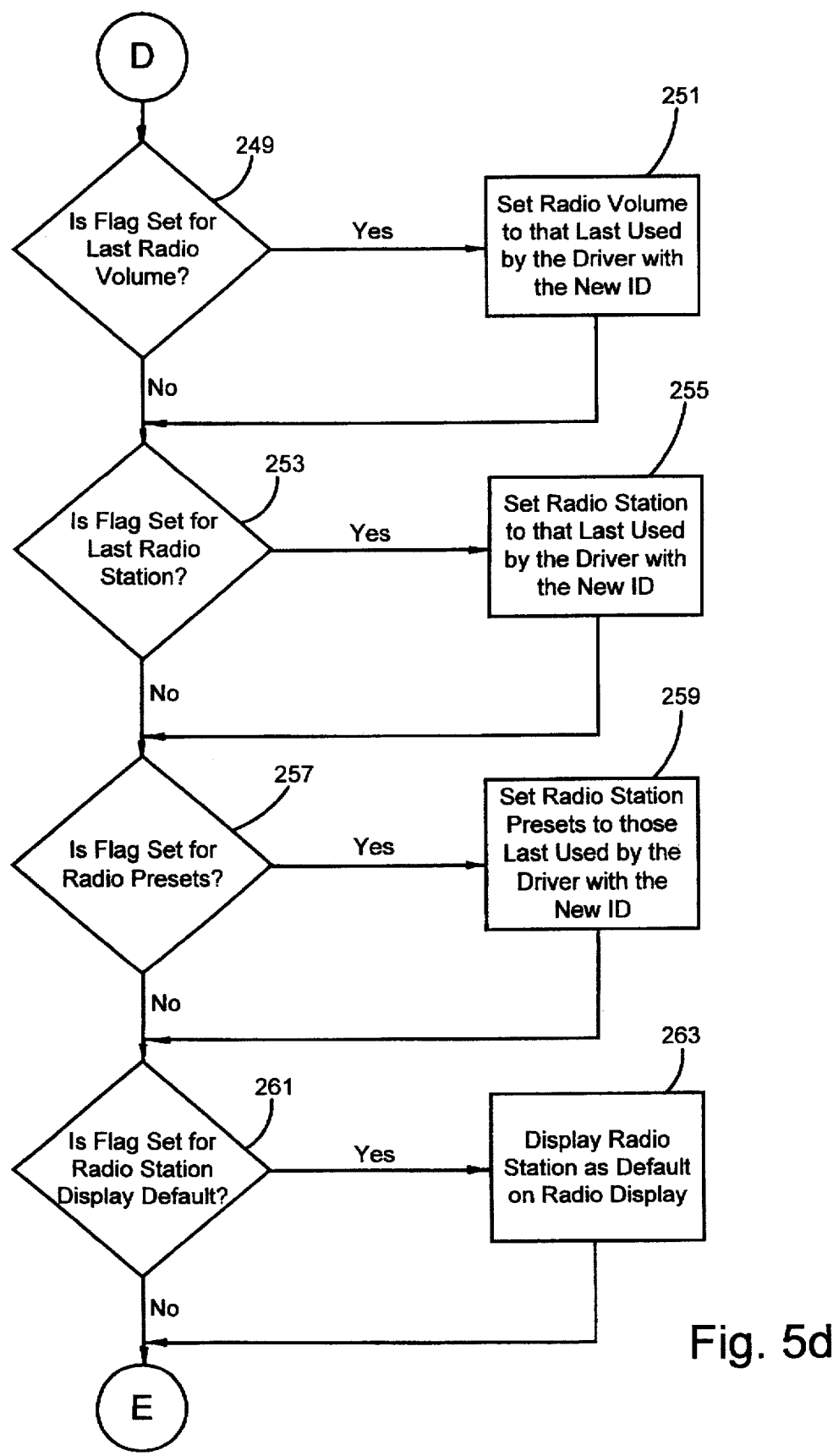
Figure 5E:
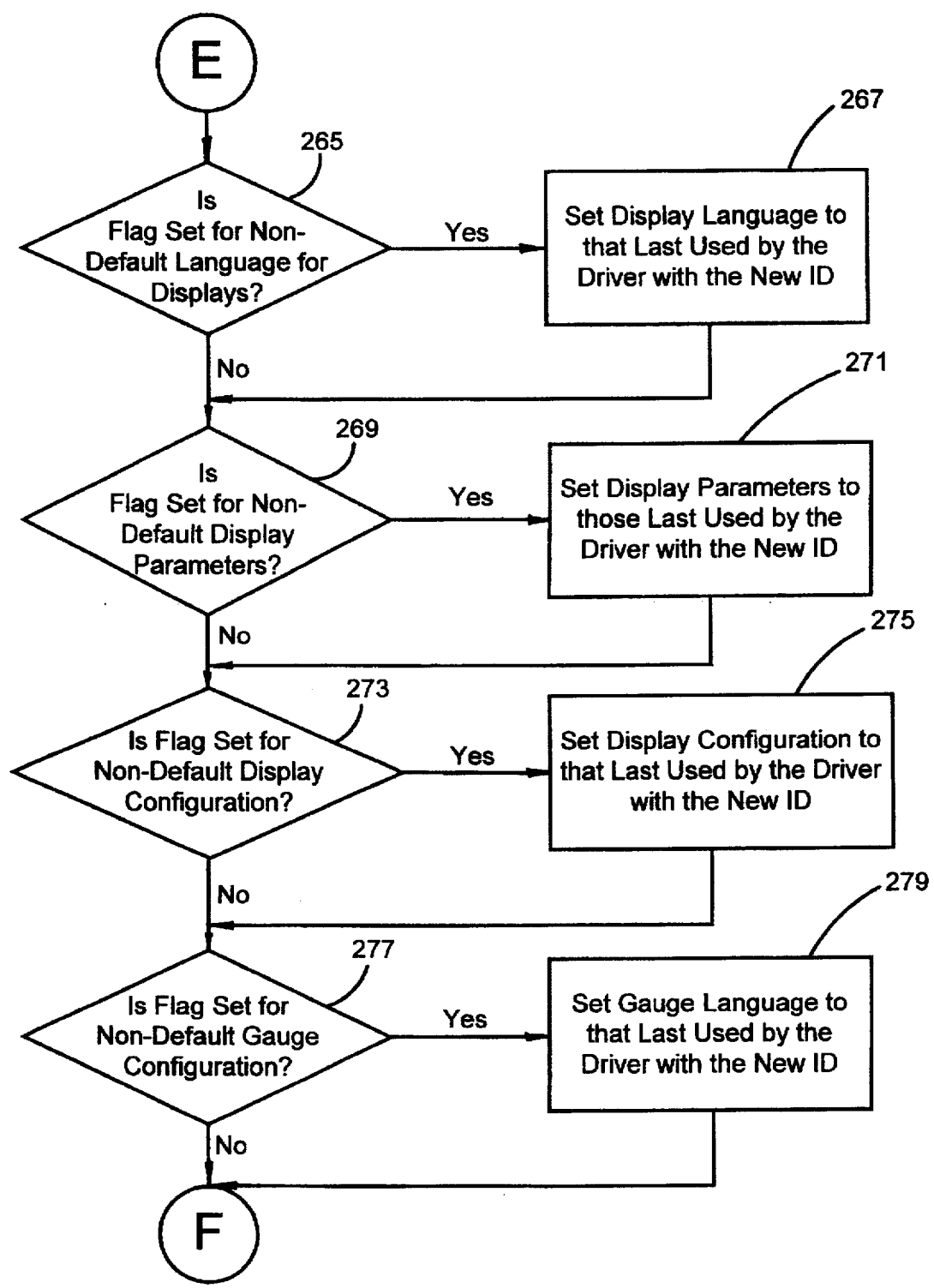

In step 219 of FIG. 5b, microcontroller 35 checks whether a new driver ID signal has been received. Because various mechanisms may be used to input a driver's ID such as a keypad or a user ID dedicated pushbutton, it may be appropriate for microcontroller 35 to monitor such input mechanisms to determine whether a new driver ID signal has been received. If a driver ID signal is received that is the same as the last user ID stored in memory, or if no new driver ID signal is received, microcontroller 35 leaves all the settings in the vehicle to those last used by the driver with the last ID stored in memory (step 221) and the program advances to step 281 shown in FIG. 5f. If a new driver ID signal is received, microcontroller 35 executes a routine (steps 223–279, FIGS. 5b–5e) to initialize various vehicle accessories to those preferred and set by the driver with the received new driver ID utilizing the flag table associated with this new ID (step 223).

A first vehicle accessory that may be initialized is the position of the driver's seat. Thus, if the driver with the new ID has selected the last seat position memory feature, microcontroller 35 will determine in step 225 that the associated flag has been set and will set the seat position to that last used by the driver with the new ID by reading seat positioning parameters stored in non-volatile memory the last time this driver used the vehicle (step 227). Next, microcontroller 35 will check whether a flag is set for a last mirror position feature (step 229), which if selected, causes microcontroller 35 to set the mirror positions to that last used by the driver with the new ID (step 23 1). If this flag is not set, the routine for setting the mirror positions is dormant with respect to the driver with the newly detected ID.

If the vehicle includes mirrors with electronically adjustable reflectivity, microcontroller 35 may check whether a flag has been set for a last mirror reflectivity feature (step 233). If the flag has been set for this feature, microcontroller 35 sets the mirror reflectivity to that last used by the driver with the new ID in step 235.

In step 237 (FIG. 5c) microcontroller 35 determines whether the vehicle ignition is on. If the vehicle ignition is not on, microcontroller 35 advances to step 281 in FIG. 5f and skips the remaining portion of the new user initialization routine. If the ignition is on, microcontroller 35 proceeds in step 239 to determine whether a flag has been set for a last temperature setting feature. If the flag has been set for this feature, microcontroller 35 will set the interior temperature for the climate control system to that last used by the driver with the new ID by retrieving the last used temperature setting from the non-volatile memory (step 241).

If the vehicle includes a compass that allows for selection of a feature that computes variations in heading based on the geographic location of the vehicle, microcontroller 35 may determine in step 243 whether the flag associated with this feature has been set. If the flag has been set, the compass will be initialized for variation based on geographic location (step 245). Otherwise, the compass will be initialized for operation without variation for geographic location (step 247).

Next in step 249 (FIG. 5d), microcontroller 35 may check whether a flag has been set for a last radio volume feature (step 249). If the last radio volume feature has been selected by the user with the detected ID, microcontroller 35 sets the radio volume to that last used by the driver with the new ID (step 251).

If a flag has been set for a last radio station feature, microcontroller 35 will detect if the flag has been set (step 253) and set the radio station to that last used by the driver with the new ID (step 255). Similarly, if microcontroller 35 detects that a flag has been set for a radio preset memory feature (step 257), microcontroller 35 sets the radio station presets to those last used by the driver with the new ID (step 259).

If the vehicle radio includes a display that displays either the radio station or the time of day, a vehicle operator may wish to select what is displayed on the radio display as a default condition. Thus, microcontroller 35 may look for a flag corresponding to a radio station display default in step 261 and display the radio station as a default on the radio display (step 263) if the flag is set. Otherwise, the time of day will be displayed on the radio display as a default.

As vehicle sophistication improves, more and more vehicles will include alpha-numeric displays to convey information to the vehicle operator. Because such vehicles may be used in countries having different primary languages, it is advantageous to allow for different languages to be displayed on the vehicle's alpha-numeric display. Moreover, it would be even more advantageous to provide for a vehicle alpha-numeric display that can be programmed to display different languages for different drivers that may use the vehicle. To this end, the main control program includes a step (265) that causes microcontroller 35 to check whether a flag for a non-default language (i.e., English) has been selected for the vehicle displays. If the flag has been set, microcontroller 35 sets the display language to that last used by the driver with the new ID (step 267) by setting a pointer to a set of memory addresses at which the selected language display messages are stored.

A related feature provided by the present invention permits the vehicle operator to select display parameters such as Fahrenheit or Centigrade, miles or kilometers, miles per hour or kilometers per hour, and/or gallons or liters, to be displayed in the vehicle's gauges and other display screens. Thus in step 269, microcontroller 35 first checks whether a flag has been set for a non-default display parameter and then sets the display parameters to those last used by the driver with the new ID (step 271) if the flag has been set.

The present invention further allows each vehicle operator to customize the vehicle's displays by reconfiguring message screens and, if desired, the message screen location. Thus, if a vehicle includes several message screen displays, a vehicle operator may reconfigure these displays such that a compass heading is displayed on a different message screen than that used in a default condition. Therefore, if microcontroller 35 determines in step 273 that a flag is set for a non-default display configuration, it will set the display configuration to that last used by the driver with the new ID (step 275).

If the vehicle employs a reconfigurable instrument panel display, the present invention allows for the vehicle operator to reconfigure the display gauges on the instrument panel display by changing their location, size, color, or existence as displayed on the instrument panel. To allow various vehicle operators to select their desired preference, microcontroller 35 determines in step 277 whether a flag has been set for a non-default gauge configuration and sets the gauge configuration to that last used by the driver with the new ID in step 279 if the flag has been set.

After completing steps 277 and 279, microcontroller 35 has completed the steps associated with initializing the vehicle for a driver having a new ID that is different from that of the last ID stored in memory. It will be appreciated by those skilled in the art that the settings associated with the last driver will be maintained and utilized during initialization provided a new user ID is not received. Following this initialization process, microcontroller 35 monitors a timer to determine when to interrupt the main program to look for a paging signal (step 281). If it is time to interrupt the main program, microcontroller 35 executes interrupt service routine 283, which is described below with reference to FIGS. 8a, 8b, and 9. Interrupt service routine begins with step 601 in FIG. 8a in which microcontroller 35 turns on an RF receiver for 250 msec. With the receiver on, microcontroller 35 looks for a preamble signal received from the demodulator in step 603. Each of the GSC and POCSAG paging formats provide a preamble digital signal and if one is not detected by the microcontroller, the interrupt counter is reset in step 605 and the program returns to step 285 (FIG. 5f) of the main program. In the event a preamble is detected, however, the receiver remains activated for receiving one of two different vehicle addresses uniquely associated with the vehicle (step 607). If an address is received, a bit error correction subroutine 609 is executed to assure that the address has been correctly received. The first vehicle address is one in which a vehicle option is to be changed by a subsequently transmitted reprogramming signal. The second address is one which is followed by a telephone number page or alpha-numeric message to be displayed. Each of these addresses are uniquely associated with a single vehicle.

The error correction routine is a standard subroutine for the different paging systems. The bit error correction subroutine is initiated in step 609 and is described in detail with reference to FIG. 9. The error correction subroutine 609 causes microcontroller 35 to read an address or message data block (step 621) and to divide the received data by a binary format constant for the respective paging formats (step 623) and to store the remainder, which is known as the syndrome (step 625). Then, microcontroller 35 tests to determine whether the syndrome is 0 (step 627). If the syndrome is 0, the data is correct and the program returns to step 611 of the interrupt service routine. If, however, the syndrome is not 0, the data is corrected by the bit indicated by the syndrome (step 629) and the data is retested through the program loop including steps 623–627.

Figure 5F:
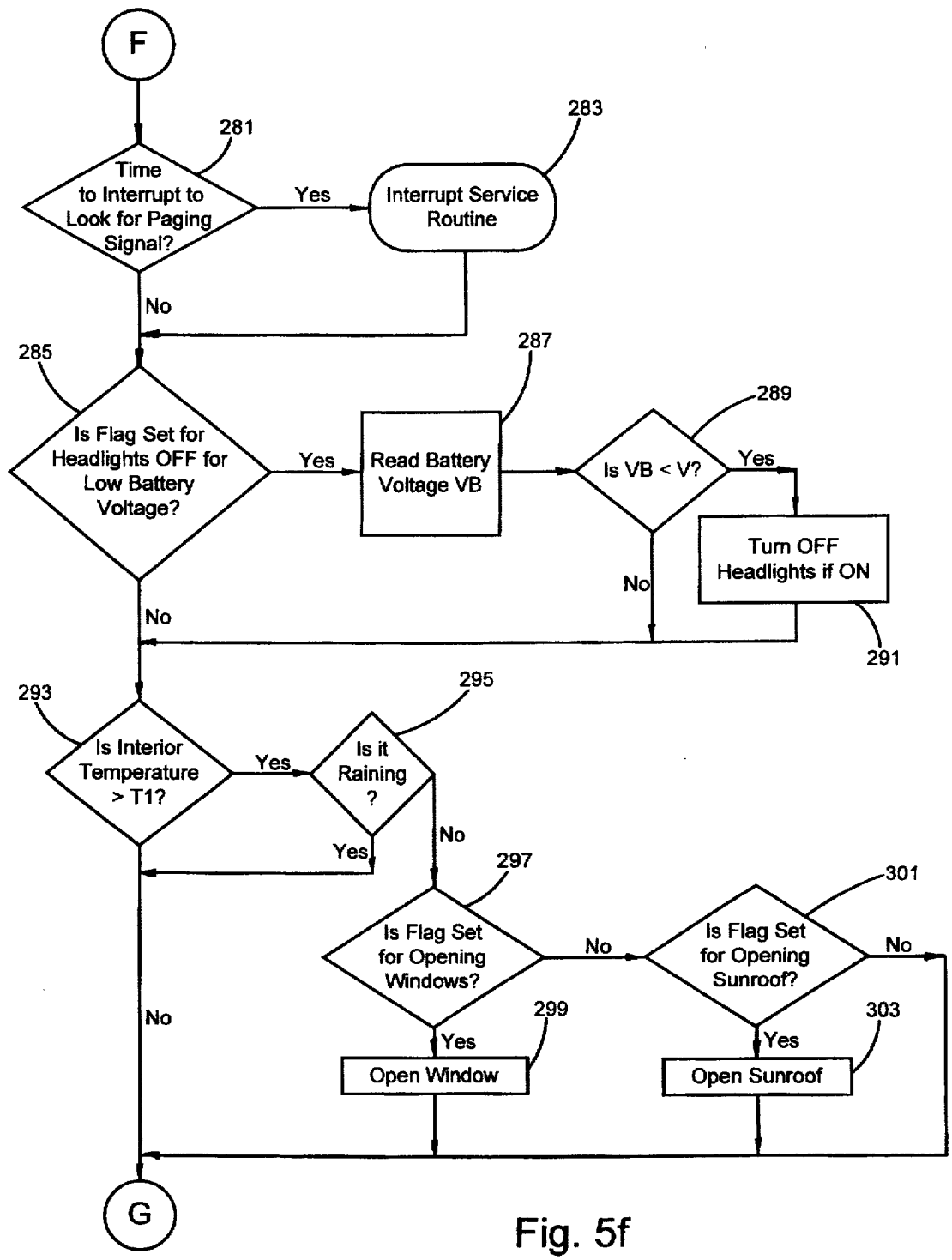
Figure 5G:
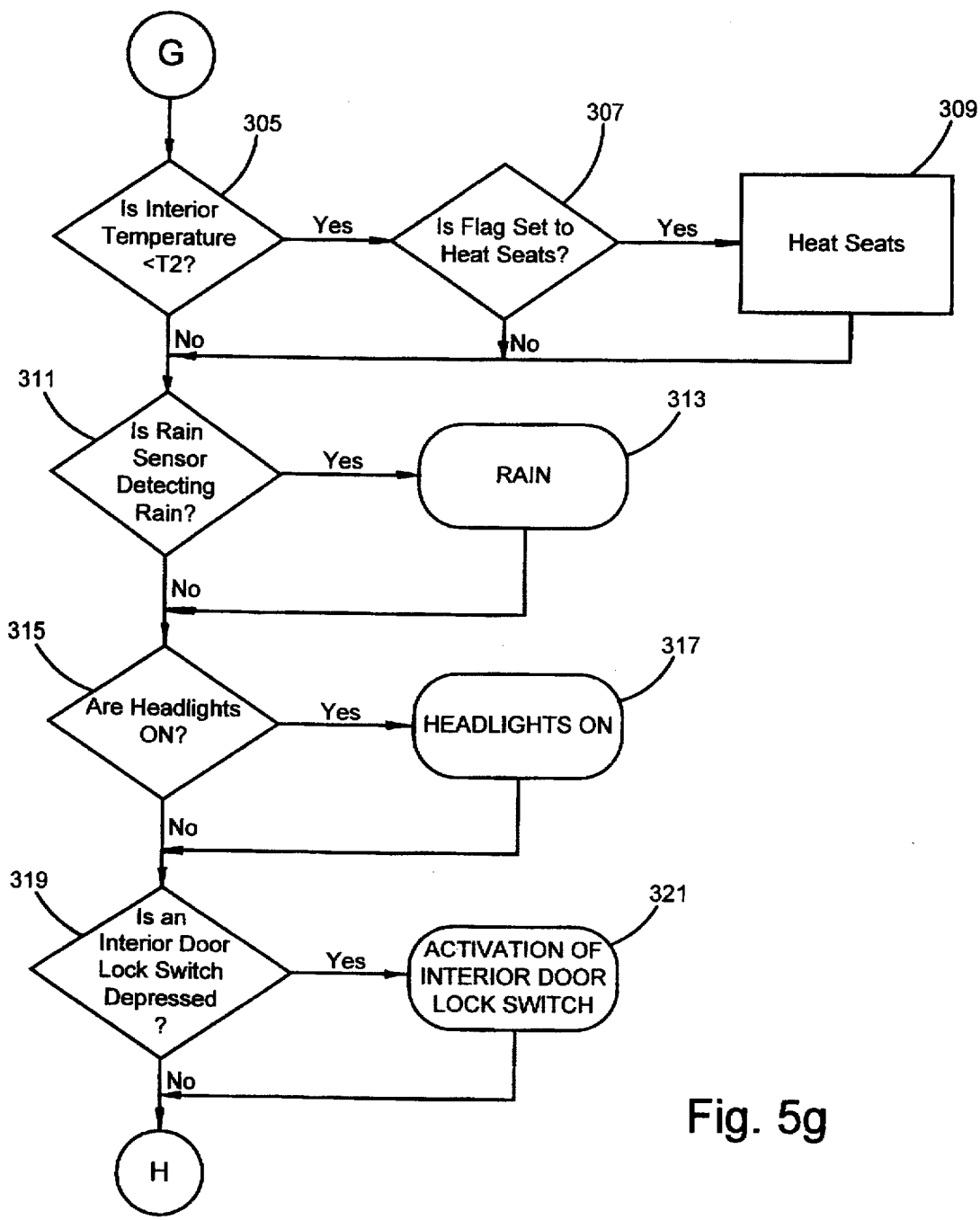
Figure 5H:
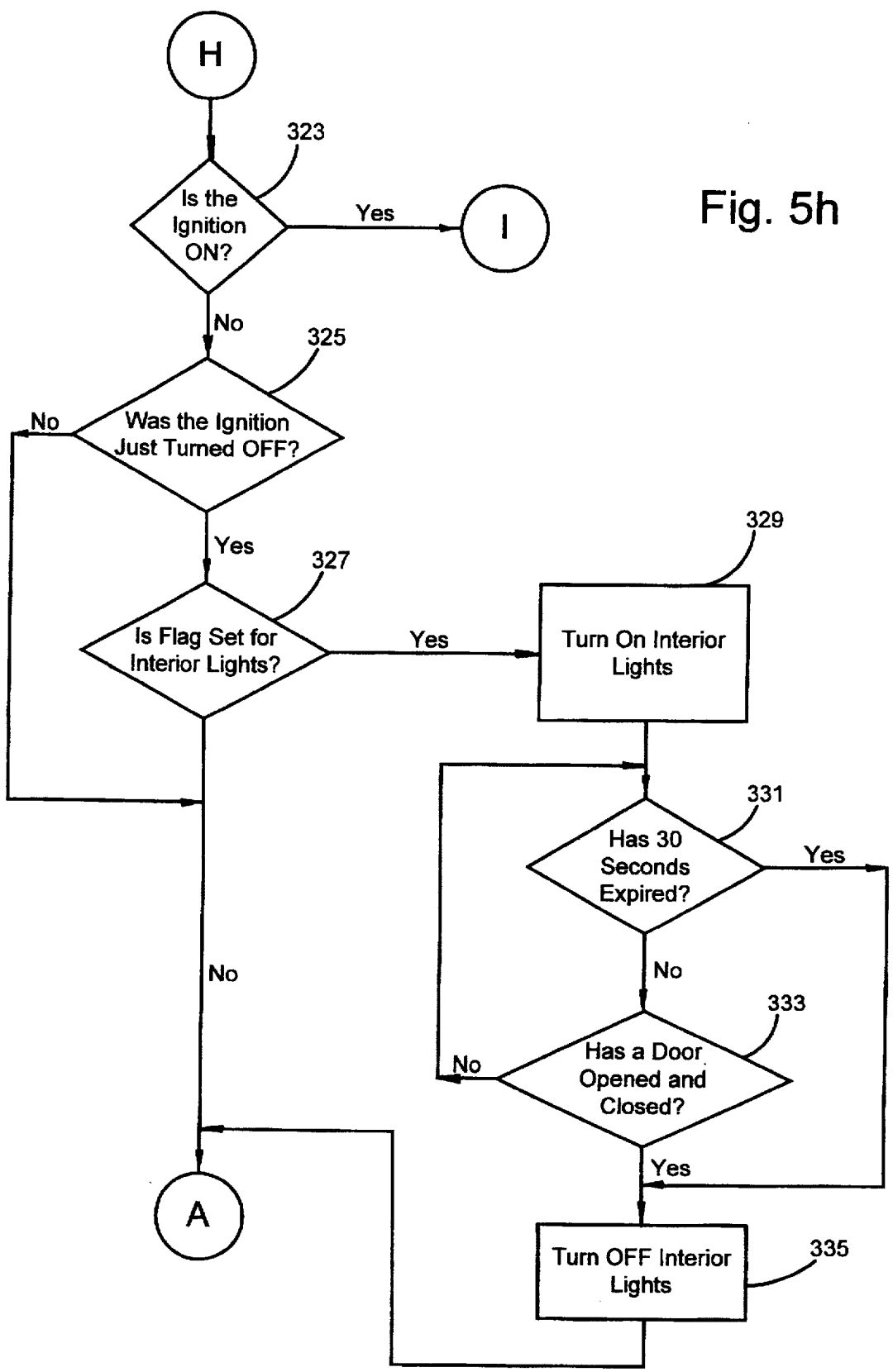

Once the bit error correction subroutine has been completed and a correct paging preamble detected, the interrupt service routine proceeds to test whether one of the vehicle's addresses has been detected (step 611). If no address is received for the particular vehicle into which the preprogrammed addresses of microcontroller 35 is installed, the program proceeds to step 605 and the interrupt counter is reset and the program advances to the main program at step 285 (FIG. 5f). If, however, one of the vehicle's addresses has been detected, the program tests whether the address is a page information address or an option personalization address (step 613). If the address corresponds to the page address, microcontroller 35 receives the paging message, stores the message, and subsequently displays the message on a message screen (step 615). A detailed procedure for performing step 615 is disclosed in parent application Ser. No. 08/390,241, now U.S. Pat. No. 5,479,157, the disclosure of which is incorporated by reference herein.

If the detected address corresponds to a personalization address, microcontroller 35 receives and decodes the paging signal and corrects errors therein using the bit error correction subroutine and subsequently defines the function in the reprogramming signal that is to be changed (step 617). Microcontroller 35 may determine from the received reprogramming signal which function is to be changed by accessing a look-up table and identifying which flags correspond to the commands included in the reprogramming signal. After identifying the flags corresponding to these commands, microcontroller 35 modifies the data structure it utilizes in determining the manner in which to control vehicle accessories by setting or resetting the flags in the flag table corresponding to a user ID also transmitted in the personalization paging signal. In this manner, microcontroller 35 reprograms the main control program as used to control vehicle accessories for a particular vehicle operator. As apparent from the foregoing and following description of the control program, the main control program includes both active and dormant subroutines which may be activated or deactivated by the setting or resetting of its associated flag. Upon reading this disclosure, those skilled in the an will recognize that various other data structures or mechanisms may be employed to reprogram the manner in which a vehicle accessory control system controls the operation of the vehicle accessories in response to detected conditions, parameters, or vehicle operator initiated activation signals. For example, the various selectable routines defining manners in which a vehicle accessory can be operated may be separately stored and executed by the control module associated with that vehicle accessory whereby the main control program either alters the data structure used by the routines in the control module or relays the reprogramming signal to the appropriate control module, which alters the data structure used by its associated control routine. In such a case, the various control modules may directly receive and act upon a sensed condition, parameter, or vehicle operator initiated activation signals. Thus, the various routines and subroutines of the main control program may be separated and delegated to the various accessory control modules and be independently executed. Alternatively, the main control program could modify the data structure it uses itself to determine a particular command to issue to a vehicle accessory control module to activate the desired one of the subroutines stored in the control module.

If it is not time for the interrupt service subroutine to be executed or if the interrupt service routine has been executed, microcontroller 35 proceeds to execute step 285 in FIG. 5f. In step 285, microcontroller 35 checks whether a flag has been set to turn off the headlights if the battery voltage is low. If the flag is set, microcontroller 35 reads the detected battery voltage VB and compares the detected battery voltage VB to a threshold voltage V to determine whether the battery voltage is below a low voltage threshold (step 289). If the battery voltage is below this threshold, microcontroller 35 will turn off the headlights if they were on (step 291) to prevent further drain on the vehicle's battery.

Another feature that may be selected is to open the windows or a sunroof if the temperature in the interior of the vehicle exceeds a threshold temperature T1 to keep the interior of the vehicle relatively cool. Although this feature may be desirable for some individuals, it may be undesirable to other individuals who, for example, may frequently park their vehicles in a high crime area. Thus, the present invention provides the flexibility for each vehicle operator to select how microcontroller 35 will respond when (in block 293) the interior temperature of the vehicle exceeds a threshold temperature T1. To prevent the windows or sunroof from being opened when it is raining, microcontroller 35 may first determine whether rain is sensed by a rain sensor in step 295. If it is raining, microcontroller 35 will not open the windows or sunroof. However, if it is not raining, microcontroller 35 will then check whether a flag has been set to open the windows when the interior temperature exceeds the threshold (step 297). If the flag has been set, microcontroller 35 will open the windows by a predetermined amount (step 299). If the flag for opening the windows has not been set, microcontroller 35 will check whether the flag has been set to open the sunroof (step 301). If the flag has been set, microcontroller 35 will issue the appropriate signal via multiplex bus 42 to an actuator for opening the sunroof (step 303). If the flag has not been set, microcontroller 35 will proceed to step 305 (FIG. 5g) without opening the windows or the sunroof.

If the interior temperature of the vehicle is below a lower, second temperature threshold T2, as may be the case during winter time (step 305), microcontroller 35 checks whether a flag has been set to heat the vehicle seats when the interior temperature falls below the second threshold T2 (step 307). If the flag has been set, microcontroller 35 will cause the vehicle's seats to heat (step 309). If the flag is not set, the routine associated with heating the seats is effectively disabled and the program advances to step 311 where microcontroller 35 determines whether the rain sensor has detected rain. If rain is detected, microcontroller 35 executes a rain subroutine 313 which will now be described in detail with reference to FIG. 10.

If rain is detected, microcontroller 35 checks whether a flag is set to close the windows (step 701). If the flag is set, microcontroller 35 will issue the appropriate control signals to the window actuators to close the windows (step 703). Then, microcontroller 35 will check whether a flag has been set to close the vehicle's sunroof (step 705). If the flag has been set, microcontroller 35 will issue the appropriate command to close the sunroof (step 707). Following execution of the rain subroutine 313, microcontroller 35 executes step 315 (FIG. 5g) to determine whether the vehicle's headlights are presently on. If the headlights are on, microcontroller 35 executes a headlights ON subroutine 317, which is described in detail below with reference to FIG. 11.

In the headlights ON subroutine 317, microcontroller 35 first tests whether the vehicle ignition is off (step 709). If the ignition is off, microcontroller 35 exits the headlights ON subroutine and returns to step 319 (FIG. 5g) of the main control program. If, on the other hand, the vehicle ignition is off and the headlights are on, microcontroller 35 determines in step 711 whether a delay flag or an indefinite ON flag has been set. If neither flag has been set, microcontroller 35 turns off the headlights (step 713) and returns to the main control program. If one of these flags are set, microcontroller 35 then determines whether the flag that is set is the indefinite ON flag (step 715). If the indefinite ON flag is set, microcontroller 35 returns to the main control program without turning off the headlights. If the indefinite ON flag is not set, microcontroller 35 assumes that the delay flag has been set and waits for the predetermined delay time (step 717) before turning off the headlights (step 719) and returning to the main control program.

The next step in the main control program instructs microcontroller 35 to determine whether an interior door lock switch has been depressed (step 319). If an interior door lock switch has been depressed, microcontroller 35 executes an associated subroutine 321, which is described below with reference to FIG. 12.

The subroutine 321 associated with the activation of an interior door lock switch begins with step 721 which causes microcontroller 35 to determine whether a flag has been set for a feature preventing the doors from being locked when a key is in the ignition. If this flag is set, microcontroller 35 determines whether there is a key in the ignition (step 723). If a key is in the ignition, microcontroller 35 activates a chime (step 725) and returns to the main control program without locking the doors in response to the activation of the interior door lock switch. If the key is not in the ignition or if the flag associated with this feature has not been set, microcontroller 35 next determines whether a flag has been set for a last door locks all doors feature (step 727). If this flag has been set, microcontroller 35 determines whether a door is presently open (step 729). If a door is presently open, microcontroller 35 will wait until all the doors are closed (step 731) before advancing to step 733 in which microcontroller 35 determines whether a flag is set to delay the activation of the locks for a predetermined time after all of the doors are closed. If this flag has been set, microcontroller 35 will wait for this predetermined time period (step 735) and again check whether a door has subsequently been opened (step 737). If a door has been reopened, microcontroller 35 returns to step 731 where it waits until all doors am closed. Once all the doors are closed and remain closed for the predetermined time period, microcontroller 35 locks all the doors (step 739) and returns to the main control program. If, in step 733, the delay flag is not set, microcontroller 35 immediately proceeds to step 739 and locks all the doors without rechecking whether a door is subsequently opened.

If, in step 727, microcontroller 35 determines that the flag for the last door locks all doors feature has not been set, microcontroller 35 then checks whether a flag has been set to delay the locking of the doors following the activation of an interior door lock switch (step 741). If the delay flag has not been set, microcontroller 35 immediately locks all doors (step 739). On the other hand, if the flag has been set, microcontroller 35 waits a predetermined time period (step 743) before locking all doors (step 739) and returning to the main control program.

The main control program resumes at step 323 (FIG. 5h) where it is determine whether the vehicle ignition is on. If the vehicle ignition is on, the main control program advances to step 337 in FIG. 5i and if the ignition is off, microcontroller 35 determines whether the ignition was just turned off (step 325). If the ignition was not just turned off, the main control program returns to its beginning at step 203 in FIG. 5a as denoted by connection port A.

If the vehicle ignition was just turned off, microcontroller 35 checks whether a flag has been set for controlling the interior lights in response to the vehicle ignition being turned off (step 327). If the flag has not been set, the main control program returns to step 203 (FIG. 5a) of the main control program. If, however, the flag has been set, microcontroller 35 turns on the vehicle's interior lights (step 329) and starts a timer. The interior lights remain on until one of the following events takes place—the expiration of a predetermined time period of, for example, thirty seconds (step 331) or the detection that a door has been opened and subsequently closed (step 333). Once one of these events has occurred, microcontroller 35 turns off the interior lights (step 335) and the program returns to step 203 at the beginning of the main control program.

Figure 5I:
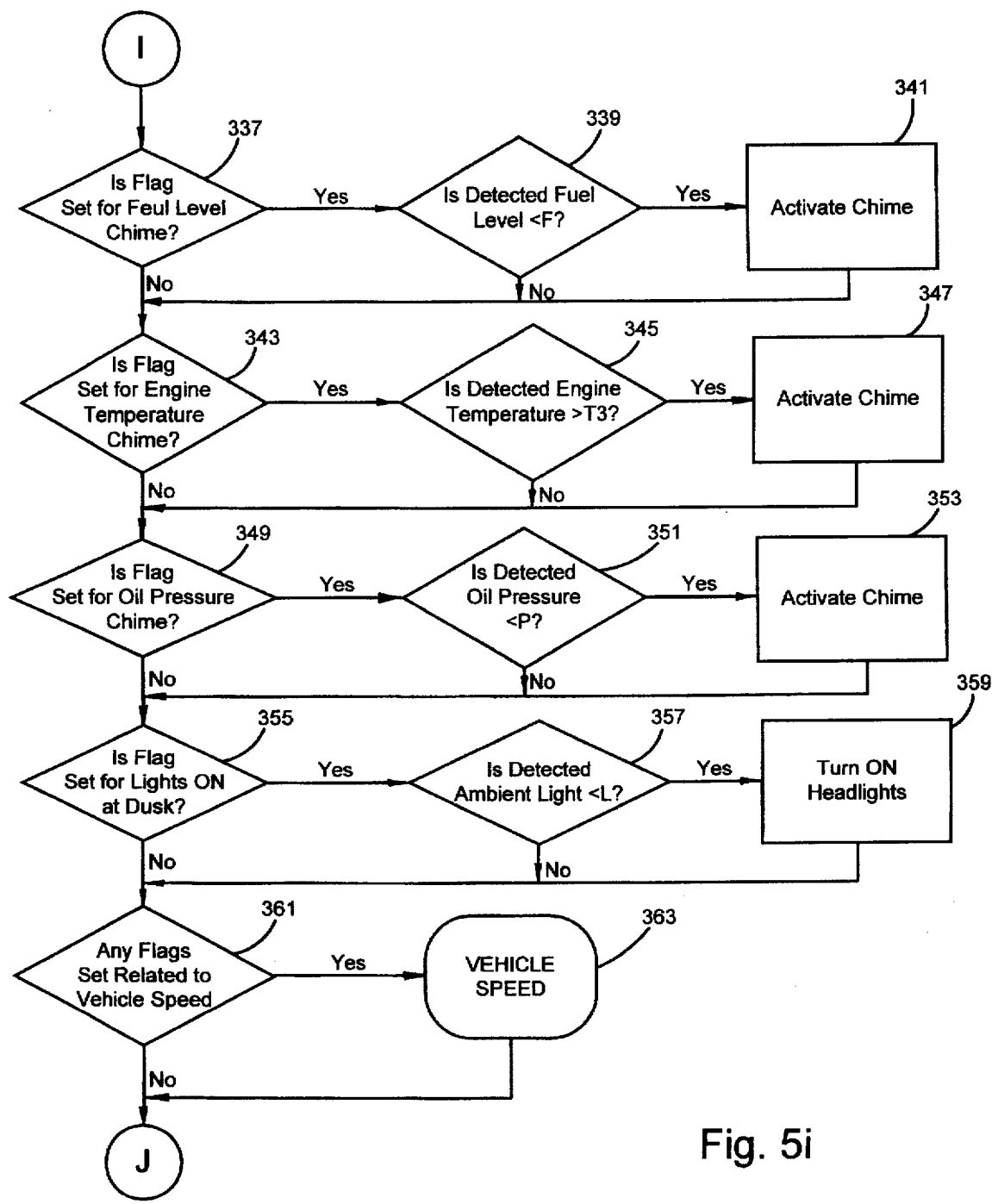

As described above, if the vehicle ignition is detected as being on in step 323, the main control program advances to step 337 in FIG. 5i where microcontroller 35 determines whether a flag has been set for a low fuel level warning chime. If this flag has been set, microcontroller 35 checks the fuel level on the associated input line and determines in step 339 whether the detected fuel level is below a low fuel level threshold F. If the fuel level is low, microcontroller 35 will activate a warning chime (step 341) which may chime once or at a predetermined interval of, for example, once every five minutes.

Next, microcontroller 35 checks whether a flag has been set for an engine temperature warning chime (step 343). If this flag has been set, microcontroller 35 obtains the detected engine temperature from the associated input terminal and determines whether the engine temperature exceeds a threshold temperature T3 (step 345). If the detected engine temperature T3, microcontroller 35 will activate a warning chime (step 347) once or at periodic intervals.

Another warning chime that may be set corresponds to a low oil pressure. Because this feature is optional, as are the other features relating to warning chimes, microcontroller 35 first determines whether the flag has been set for the oil pressure warning chime (step 349). If the flag has been set, microcontroller 35 reads the detected oil pressure from the associated input terminal and determines whether the detected oil pressure is less than a predetermined threshold P (step 351). If detected oil pressure is less than this threshold pressure, microcontroller 35 activates a warning chime (step 353).

Yet another feature that may be selected is to have your headlights automatically turn on at dusk or whenever an exterior ambient light level falls below a threshold level. To perform this feature, microcontroller 35 first checks whether a flag has been set for this feature (step 355) and retrieves the detected ambient light level from an associated input terminal and determines whether the detected ambient light level is below a threshold level L (step 357). If the detected level is below threshold L, microcontroller 35 will turn on the vehicle's headlights (step 359).

The present invention allows various accessories to be controlled in response to a detection of the vehicle speed. Thus, as the next step, microcontroller 35 may check whether any of the flags have been set that are related to the vehicle speed (step 361). If any of these flags have been set, microcontroller 35 will execute a vehicle speed subroutine 363, which is described below with reference to FIG. 13.

The vehicle speed subroutine 363 begins at step 745 at which microcontroller 35 determines whether a flag has been set for a speed warning chime. If this flag has been set, microcontroller 35 reads the vehicle speed from the associated input terminal and determines whether the speed exceeds a first speed threshold X1 (step 747). If the vehicle speed exceeds this threshold, which may be set manually to correspond to the speed limit, for example, microcontroller 35 activates a warning chime (step 749), which chimes periodically until the vehicle speed fails back below the first speed threshold X1.

Next, microcontroller 35 may check whether a flag has been set for a feature by which the door locks lock when the speed of the vehicle exceeds a threshold level (step 751). If the flag has been set, microcontroller 35 reads the vehicle speed from the associated input terminal and determines whether this speed exceeds a second speed threshold X2 (step 753). If the second speed threshold X2 is exceeded, microcontroller 35 proceeds to lock all the doors of the vehicle (step 755). Typically, the second speed threshold X2 will be set at a relatively low speed to insure the safety of the vehicle's occupants.

As the vehicle's speed increases, the interior noise level within the vehicle will also increase. Therefore, another feature that may be selected adjusts the radio volume proportional to the vehicle's speed. If, in step 757, microcontroller 35 determines that the radio volume flag has been set, it will then determine whether the radio is on in step 759. If the radio is on, microcontroller 35 will obtain the vehicle speed from the appropriate input line and adjust the radio volume proportionally to any changes in vehicle speed and will return to the main control program at step 365 in FIG. 5j.

In step 365, microcontroller 35 checks whether any flags have been set relating to gear position. If any such flags have been set, microcontroller 35 executes a gear position subroutine 367, which is shown in detail in FIG. 14. In the gear position subroutine 367, microcontroller 35 first determines what gear the vehicle is in (step 763). If the vehicle is in drive, microcontroller 35 next determines whether a flag has been set for a feature in which the doors are automatically locked when the vehicle is put in drive (step 765). If the flag has been set, microcontroller 35 locks all the doors (step 767) before returning to step 369 (FIG. 5j) of the main control program.

If the vehicle is in park, microcontroller 35 checks whether a flag has been set to automatically unlock the doors (step 769). If this flag has been set, microcontroller 35 automatically unlocks the doors when the vehicle is in park (step 771).

If the vehicle is in reverse, microcontroller 35 determines whether a flag has been set to automatically tilt the passenger side exterior mirror downward when the vehicle is in reverse (step 773). If this flag has been set, microcontroller 35 tilts the passenger side mirror downward to a predetermined angle (step 775) and determines whether the vehicle is still in reverse (step 777). When the vehicle is no longer in reverse, microcontroller 35 tilts the passenger side mirror back to its original position (step 779) before returning to the main control program. This mirror tilting feature is particularly suited for vehicle operators who frequently parallel park their vehicles next to a curb.

Figure 15:
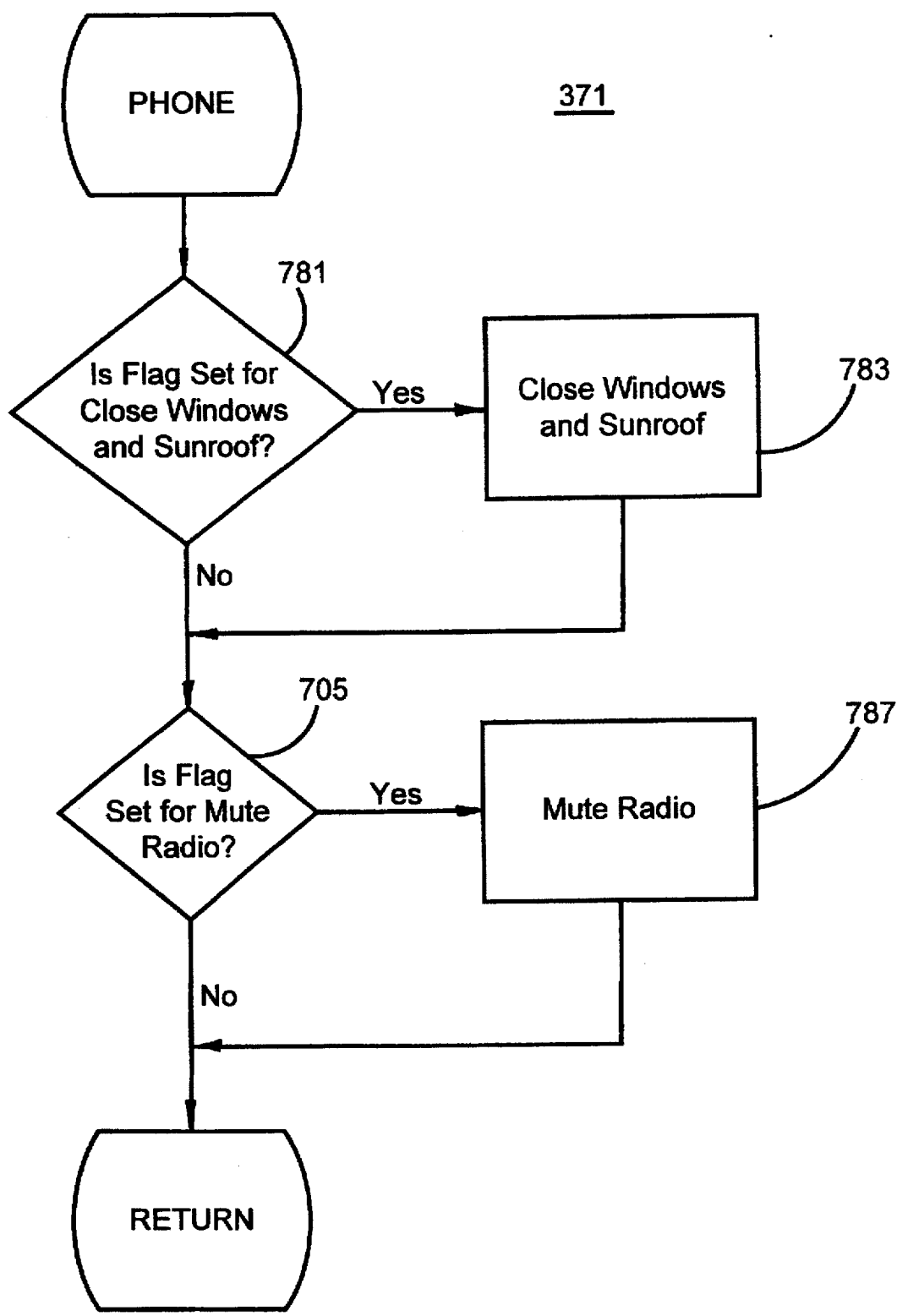
FIG. 15 is a flow diagram of a ninth subroutine that may be called by the main control program.

At the next step in the main control program, microcontroller 35 checks whether there is an incoming phone call (step 369). If there is an incoming phone call, microcontroller 35 executes a phone subroutine 371 that identifies several selectable features relating to vehicle accessory operation in response to an incoming phone call. Phone subroutine 371 is shown in FIG. 15 and begins with microcontroller 35 determining whether a flag is set for a closed windows and sunroof feature (step 781). If this flag has been set, microcontroller 35 will close the windows and sunroof in response to an incoming phone call (step 783). By automatically closing the windows and sunroof when an incoming phone call is received, the vehicle operator will not have to fumble around to close all the windows and sunroofs to cut down on the interior noise so that the vehicle operator may subsequently answer the incoming phone call.

Another option that may be selected to make receiving a phone call much easier for a vehicle operator is a feature which automatically mutes the radio when an incoming phone call is received. If microcontroller 35 determines in step 785 that the flag is set for this feature, microcontroller 35 will automatically mute the radio (step 787) in response to the detection of an incoming phone call.

Figure 5J:
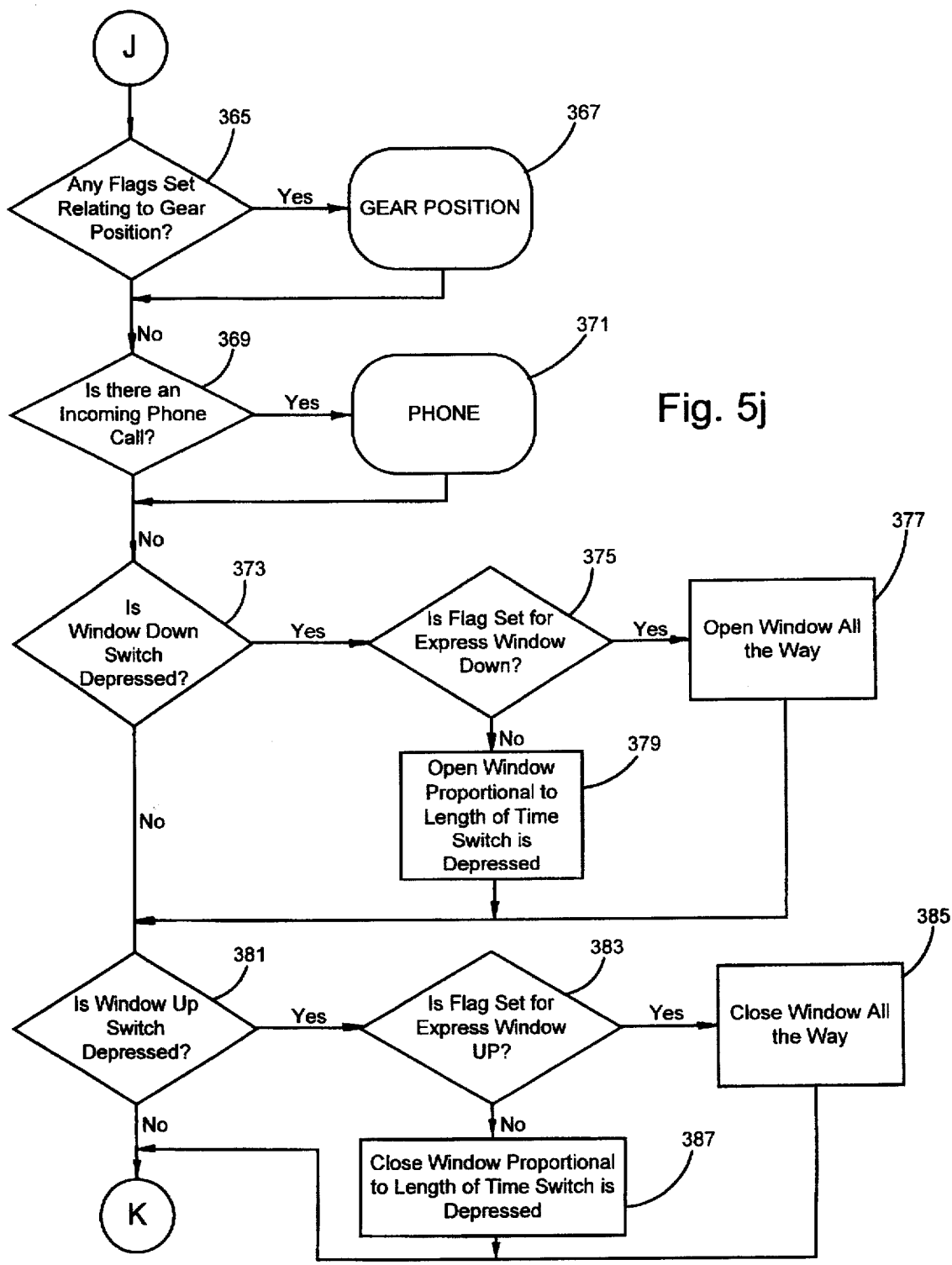

After determining that there is no incoming phone call or executing the phone subroutine 371, microcontroller 35 continues in the main control program by determining whether a window down switch has been depressed (step 373, FIG. 5j). If the vehicle operator has depressed the window down switch, microcontroller 35 will check a flag to determine the manner in which the window actuator is to be controlled in response to this vehicle operator initiated activation signal associated with a window down function (step 375). If the flag has been set for an express window feature, microcontroller 35 will automatically open the window all the way without regard to the length of time the button is depressed (step 377). If the flag has not been set, microcontroller 35 opens the window an amount proportional to the length of time the switch is depressed (step 379). Similarly, if a window up switch is depressed (step 381), microcontroller 35 determines whether a flag has been set for an express window up feature (step 383). If this flag has been set, microcontroller 35 closes the window all the way (step 385). Otherwise, microcontroller 35 will close the window an amount proportional to the length of time the switch is depressed (step 387).

Figure 5K:
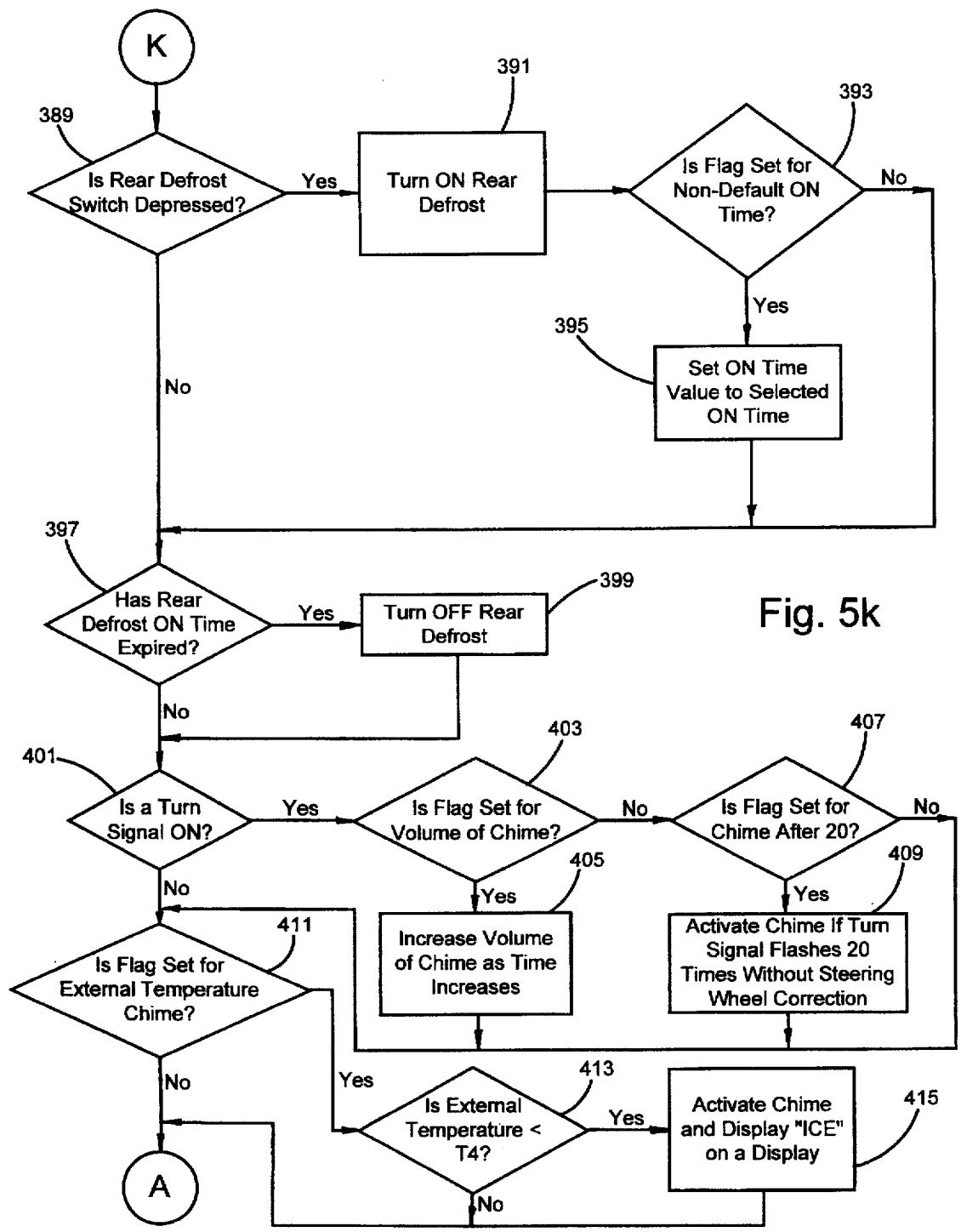

The main control program then advances to step 389 in FIG. 5k, in which microcontroller 35 determines whether the rear defrost switch has been depressed. If this switch has been depressed, microcontroller 35 will turn on the rear defrost and start a timer (step 391) and will check whether a flag has been set for a non-default ON time (step 393). If the flag has been set, microcontroller 35 will set and store an ON time value to the selected ON time (step 395). Otherwise, the stored and set ON time value will correspond to the default ON time for the rear defrost circuit. Then, microcontroller 35 will check whether the rear defrost ON time has expired (step 397) and will turn off rear defrost if the time has expired (step 399).

Next, microcontroller 35 checks whether a turn signal is on (step 401) and checks the flags for features associated with the turn signal. The first feature that may be selected increases the volume of a chime associated with the turn signal as the time the turn signal is on increases. Thus, if the associated flag is set for this feature (step 403), microcontroller 35 will increase the volume of the chime as the length of time that the turn signal is on increases in order to alert the driver if the turn signal did not turn off following a turn or lane change. If the flag is not set for this feature, microcontroller 35 will check whether a flag is set for a feature which activates a chime after a turn signal has flashed twenty times without a steering wheel correction being made (step 407). If this flag is set, microcontroller 35 will count the number of times the turn signal has flashed and will activate a chime after twenty flashes without a steering wheel correction being made (step 409).

Next, microcontroller 35 checks a flag associated with a feature for activating a chime upon the detection of a low exterior temperature (step 411). If the flag has been set, microcontroller 35 reads the external temperature from the associated input terminal and determines whether this temperature is less than a threshold T4, which may be, for example, 32° F. or 0° C. (step 413). If the external temperature is less than threshold T4, microcontroller 35 will activate a chime and display "ICE" on one of the vehicle's displays (step 415). The control application then returns to step 203 in FIG. 5a as denoted by connection port A.

Those skilled in the art will recognize that the main control program described above may be modified to include or eliminate or rearrange various steps associated with the control of the vehicle's accessories to accommodate various combinations of vehicle accessories and their control options. Further, the control program may be reprogrammed by invoking a program editing routine in response to a reprogramming signal, which edits the main control program by adding or deleting command lines in the main control program that call the various subroutines relating to selectable control functions.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

APPENDIX A

GSC Paging Format

The GSC code format consists of a preamble, a start code, an address and one or more blocks of data. The blocks of data are transmitted at twice the bit rate as the start code and address.

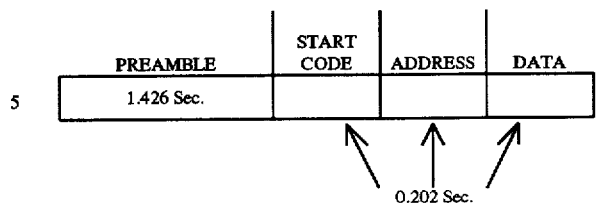

Preamble

The preamble begins with a comma which is 14 bits of a reversal pattern, alternating zeroes and ones. The comma is followed by 18 repetitions of the same 23 bit pattern. There exist 10 different bit pattern in use today. This divides the population of GSC receiving pagers into ten groups. If a pager detects the bit pattern of its group, it will continue to receive the address otherwise it will return to its low current mode. This way, the receiver need only sample often enough assume that the preamble is detected and pages won't be missed.

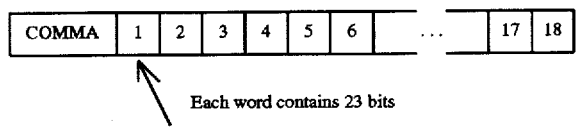

Start Code:

The start code marks the end of the preamble and signals that an address is to follow. It also provides timing information when pages are being sent in batches.

Address:

The start code and address begin with a comma followed by two 23-bit words. These bits are transmitted at 300 bits per second. The two words provide enough data to uniquely define 100,000 different addresses and correct errors in transmission.

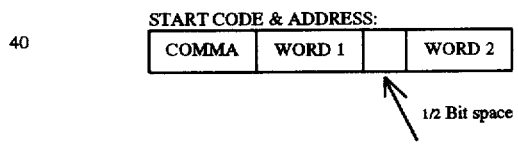

Word Format:

Each 23 bit word begins with 12 information bits followed by 11 parity bits. The parity bits are included to provide a way of detecting bit errors and correcting them. Eleven parity bits are sufficient to correct at most 3 bit errors per word.

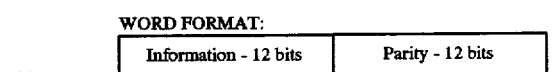

Data Block Format:

Each block of data begins with a half bit space followed by 8 words of 15 bits each. These bits are transmitted at 600 bits per second which is twice as fast as start code and address bits. The information in each word contains error detection and correction bits but only allows for upper case characters when sending alpha-numeric data.

POCSAG Paging Format:

The POCSAG code format consists of a preamble and one or more batches of data codewords. The batches are separated by a frame synchronization code.

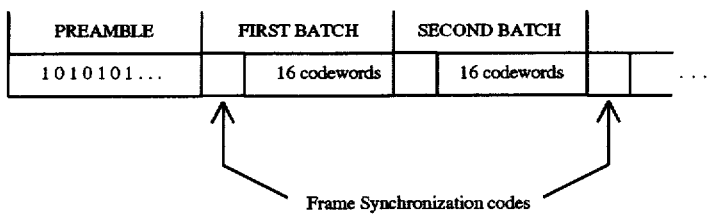

Frame Synchronization codes

Preamble:

The preamble is 576 bits of a reversal pattern, alternating zeros and ones. It is included to alert the receiver that data is to follow. This way, the receiver need only sample often enough to assure that the preamble is detected and pages won't be missed.

Preamble:
| 1 0 1 0 1 0 1 0 1 0 1 ... for a total of 576 bits |

Frame Synchronization Code:

The frame synchronization (FS) code is a unique combination of 32 bits. The FS is used to identify the beginning of each batch of and to provide a starting point by which the frames of data within each batch can be counted.

Frame Synchronization Code (32 bits):
| 0 1 1 1 1 1 0 0 1 1 0 1 0 0 1 0 0 0 0 1 0 1 0 1 1 1 0 1 1 0 0 |

Batch:

Each batch of data begins with a FS and is followed by 8 frames of data. Each frame of data must contain 2 codewords. Each codeword is 32 bits long. If a page requires an odd number of codewords, an extra idle codeword is used to complete the frame. The idle codeword is a unique pattern like the FS.

Codeword Bit number:

| 1 | 2 through 19 | 20 | 21 | 22 through 31 | 32 |
|---|---|---|---|---|---|

Address Codeword:

| 0 | Address bits | Source Id | Parity bits | Even |
|---|---|---|---|---|

Message Codeword:

| 1 | Message bits | Parity bits | Even |
|---|---|---|---|

Address Codeword:

This codeword contains an address in bits 2 through 19 which makes this page specific to one pager within the population of pagers. Included in the 18 bit address are three bits which define the frame (0 through 7) in which the next codeword will be found. The next 2 bits, 20 and 21, identify the source as being from one of four groups of sources within an area. The next 10 bits (22 through 31) are included for error detection and correction and the last bit (32) provides even parity.

Message Codeword:

This codeword contains a 20 bit message of any information in bits 2 through 21. The integrity of these information bits is protected by the error detection and correction routines as the address codewords above. The information bits contain alpha-numeric data encoded as 7 bit ASCII characters.

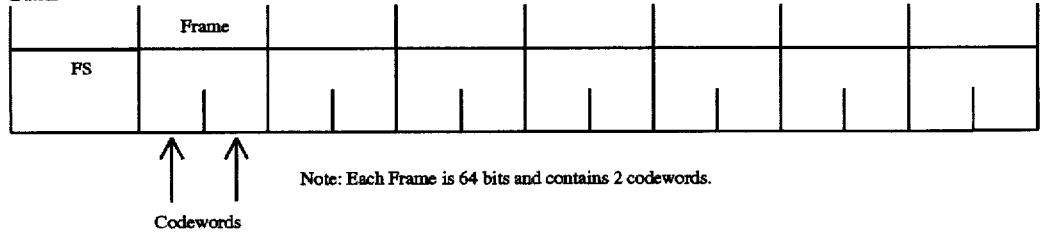

Idle Code (32 bits):
| 0 1 1 1 1 0 1 0 1 0 0 0 1 0 0 1 1 1 0 0 0 0 0 1 1 0 0 1 0 1 1 1 |

Codeword Structure:

Each codeword is 32 bits in length. The first bit indicates the type of data that the codeword contains. A zero in the first bit indicates that the codeword contains address data. A one in the first bit indicates that the codeword contains message data. In each type of codeword, the data is in bits 2 through 21. Bits 22 through 32 are used as parity bits for error detection and correction algorithms.

The embodiments of the invention in which an exclusive property or privilege is claimed are defined as follows:

1. A vehicle accessory control system comprising:

a plurality of electrically operated vehicle accessories;

a receiver to be located in a vehicle for receiving paging signals from a land-based paging transmitter, wherein the paging signals include an address uniquely identifying the vehicle and a reprogramming signal for reprogramming the operation of at least one of said plurality of vehicle accessories;

a control circuit communicatively coupled to said receiver and to said plurality of vehicle accessories, said control circuit including:

an input interface for receiving information regarding a plurality of sensed conditions, a memory for storing a control program, control means coupled to said input interface and said memory for controlling the operation of said plurality of vehicle accessories in accordance with the control program stored in said memory in response to sensed conditions received from said input interface, reprogramming means for selectively reprogramming the control program in response to the detection of a paging signal including an address identifying the vehicle and said reprogramming signal, to selectively change the manner in which said control means controls the operation of at least one of said plurality of vehicle accessories.

2. The system as defined in claim 1, wherein said reprogramming means reprograms the control program to selectively change a sensed condition to which said control means is responsive when controlling a particular one of said vehicle accessories.

3. The system as defined in claim 1, wherein said reprogramming means reprograms the control program to selectively change the manner in which said control means controls one of said vehicle accessories in response to a particular sensed condition.

4. The system as defined in claim 3, wherein a particular sensed condition includes a vehicle operator initiated activation signal and said reprogramming means reprograms the control program to selectively change the manner in which said control means controls one of said vehicle accessories in response to a vehicle operator initiated activation signal.

5. The system as defined in claim 1, wherein said reprogramming means reprograms the control program by modifying a data structure used by the control program in determining the manner by which to control said vehicle accessories.

6. The system as defined in claim 1, wherein said control program includes a plurality of dormant routines each relating to an operation for at least one of said plurality of vehicle accessories, wherein said reprogramming means activates a selected dormant routine in response to a reprogramming signal corresponding to the selected dormant routine.

7. The system as defined in claim 6, wherein said reprogramming means activates a selected dormant routine by setting a flag related to the selected dormant routine.

8. The system as defined in claim 1, wherein said control program includes a plurality of active routines each relating to an operation for one of said plurality of vehicle accessories, wherein said reprogramming means deactivates a selected active routine in response to a reprogramming signal corresponding to the selected active routine.

9. The system as defined in claim 8, wherein said reprogramming means deactivates a selected active routine by resetting a flag related to the selected active routine.

10. The system as defined in claim 1, wherein at least one of said plurality of vehicle accessories is a display for displaying information supplied by said control circuit, and said reprogramming means reprograms the manner in which said display displays the supplied information.

11. The system as defined in claim 1 and further including a display communicatively coupled to said control circuit for displaying information to the vehicle operator indicating that a vehicle accessory has been reprogrammed.

12. A vehicle accessory control system comprising:

an electrically operated vehicle accessory;

a receiver to be located in a vehicle for receiving paging signals from a land-based paging transmitter, wherein the paging signals include an address uniquely identifying the vehicle and a reprogramming signal for reprogramming the operation of said vehicle accessory;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said vehicle accessory in accordance with the control program stored in said memory in response to a sensed condition received from said input interface, reprogramming means for selectively reprogramming the control program in response to the detection of a paging signal including an address identifying the vehicle and said reprogramming signal, to selectively change a sensed condition to which said control means is responsive when controlling said vehicle accessory.

13. The system as defined in claim 12, wherein said accessory includes a plurality of door locks and said reprogramming means reprograms the manner in which said door locks are controlled to respond to a detected speed of the vehicle by locking said door locks when the vehicle reaches a predetermined speed.

14. The system as defined in claim 12, wherein said accessory includes a radio having a volume control and said reprogramming means reprograms the manner in which the radio volume control responds to a speed of a vehicle by increasing the volume of said radio as the speed of the vehicle increases.

15. The system as defined in claim 12, wherein said accessory includes automatic windows and said reprogramming means reprograms the manner in which the automatic windows respond to a rain sensor by raising said windows when said rain sensor senses rain.

16. The system as defined in claim 12, wherein said accessory is an automatic sunroof and said reprogramming means reprograms the manner in which the automatic sunroof responds to a rain sensor by closing said sunroof when said rain sensor senses rain.

17. The system as defined in claim 12, wherein said accessory is a warning indicator and said reprogramming means reprograms the manner in which said warning indicator responds to a speed of the vehicle by activating said warning indicator when the vehicle reaches a predetermined speed.

18. The system as defined in claim 12, wherein said accessory is a horn and said reprogramming means reprograms said horn to honk in response to the locking of all the vehicle doors following a locking signal transmitted from a remote keyless entry transmitter.

19. The system as defined in claim 12, wherein said accessory includes headlamps and said reprogramming means reprograms said headlights to turn off when a detected vehicle battery voltage is below a predetermined level.

20. A vehicle accessory control system comprising:

an electrically operated vehicle accessory;

a receiver to be located in a vehicle for receiving paging signals from a land-based paging transmitter, wherein the paging signals include an address uniquely identifying the vehicle and a reprogramming signal for reprogramming the operation of said vehicle accessory;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said vehicle accessory in accordance with the control program stored in said memory in response to a sensed condition received from said input interface, reprogramming means for selectively reprogramming the control program in response to the detection of a paging signal including an address identifying the vehicle and said reprogramming signal, to selectively change the manner in which said control means controls said vehicle accessory in response to a particular sensed condition.

21. The system as defined in claim 20, wherein said reprogramming means reprograms the control program to selectively change the manner in which said control means controls one of said vehicle accessories in response to a vehicle operator initiated activation signal.

22. The system as defined in claim 20, wherein said accessory include headlamps and said reprogramming means reprograms the time at which said headlamps are turned off after a vehicle ignition is turned off.

23. The system as defined in claim 20, wherein said accessory is a rear window defroster and said reprogramming means reprograms the time period during which said rear window defroster remains on after being activated.

24. The system as defined in claim 20, wherein said accessory includes door locks and said reprogramming means reprograms said door locks not to lock in response to an actuation of a door lock switch if a key is in the vehicle's ignition.

25. A vehicle accessory control system comprising:

an electrically operated display;

a receiver to be located in a vehicle for receiving paging signals from a land-based paging transmitter, wherein the paging signals include an address uniquely identifying the vehicle and a reprogramming signal for reprogramming the operation of said display;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said display in accordance with the control program stored in said memory in response to a sensed condition received from said input interface, reprogramming means for selectively reprogramming the control program in response to the detection of a paging signal including an address identifying the vehicle and said reprogramming signal, to selectively reprogram the manner in which said display displays supplied information.

26. The system as defined in claim 25, wherein said reprogramming means reprograms the language of the information to be displayed on said display.

27. The system as defined in claim 25, wherein said reprogramming means reprograms the measurement units for parameters to be displayed on said display.

28. The system as defined in claim 25, wherein said display is an instrument display panel including a plurality of displayed gauges for displaying vehicle parameters, and said reprogramming means reprograms the manner in which said gauges are configured on said instrument display panel.

29. The system as defined in claim 25, wherein said display is a radio display on a radio and said reprogramming means reprograms the default display information which said radio displays on said radio display upon initial activation.

30. The system as defined in claim 25, wherein said display is a message screen of an accessory and said reprogramming means reprograms the manner in which said accessory displays information by reconfiguring said message screen.

31. The system as defined in claim 25 and further including a plurality of displays coupled to said control circuit, wherein said reprogramming means reprograms which information is to be displayed on each of said displays.

32. A vehicle accessory control system comprising:

a plurality of electrically operated vehicle accessories;

a receiver to be located in a vehicle for receiving transmitted signals from a land-based transmitter, wherein the transmitted signals include an address uniquely identifying the vehicle and a reprogramming signal for reprogramming the operation of at least one of said plurality of vehicle accessories;

a control circuit communicatively coupled to said receiver and to said plurality of vehicle accessories, said control circuit including:

an input interface for receiving information regarding a plurality of sensed conditions, a memory for storing a control program, control means coupled to said input interface and said memory for controlling the operation of said plurality of vehicle accessories in accordance with the control program stored in said memory in response to sensed conditions received from said input interface, reprogramming means for selectively reprogramming the control program in response to the detection of a transmitted signal including an address identifying the vehicle and said reprogramming signal, to selectively change the manner in which said control means controls the operation of at least one of said plurality of vehicle accessories.

33. A vehicle accessory control system comprising:

an electrically operated vehicle accessory;

a receiver to be located in a vehicle for receiving transmitted signals from a land-based transmitter, wherein the transmitted signals include an address uniquely identifying the vehicle and a reprogramming signal for reprogramming the operation of said vehicle accessory;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said vehicle accessory in accordance with the control program stored in said memory in response to a sensed condition received from said input interface, reprogramming means for selectively reprogramming the control program in response to the detection of a transmitted signal including an address identifying the vehicle and said reprogramming signal, to selectively change a sensed condition to which said control means is responsive when controlling said vehicle accessory.

34. A vehicle accessory control system comprising:

an electrically operated vehicle accessory;

a receiver to be located in a vehicle for receiving transmitted signals from a land-based transmitter, wherein the transmitted signals include an address uniquely identifying the vehicle and a reprogramming signal for reprogramming the operation of said vehicle accessory;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said vehicle accessory in accordance with the control program stored in said memory in response to a sensed condition received from said input interface, reprogramming means for selectively reprogramming the control program in response to the detection of a transmitted signal including an address identifying the vehicle and said reprogramming signal, to selectively change the manner in which said control means controls said vehicle accessory in response to a particular sensed condition.

35. A vehicle accessory control system comprising:

an electrically operated display;

a receiver to be located in a vehicle for receiving transmitted signals from a land-based transmitter, wherein the transmitted signals include an address uniquely identifying the vehicle and a reprogramming signal for reprogramming the operation of said display;

a control circuit communicatively coupled to said receiver and to said vehicle accessory, said control circuit including:

an input interface for receiving information regarding a sensed condition, a memory for storing a control program, control means coupled to said input interface and said memory for controlling the operation of said display in accordance with the control program stored in said memory in response to a sensed condition received from said input interface, reprogramming means for selectively reprogramming the control program in response to the detection of a transmitted signal including an address identifying the vehicle and said reprogramming signal, to selectively reprogram the manner in which said display displays supplied information.

* * * * *